US011714724B2

(12) United States Patent
Murphy

(10) Patent No.: US 11,714,724 B2
(45) Date of Patent: *Aug. 1, 2023

(54) INCREMENTAL VAULT TO OBJECT STORE

(71) Applicant: Google LLC, Mountain View, CA (US)

(72) Inventor: Christopher Murphy, Westwood, MA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/810,101

(22) Filed: Jun. 30, 2022

(65) Prior Publication Data

US 2022/0334926 A1    Oct. 20, 2022

Related U.S. Application Data

(63) Continuation of application No. 16/148,887, filed on Oct. 1, 2018, now Pat. No. 11,403,178.

(Continued)

(51) Int. Cl.
*G06F 16/27* (2019.01)
*G06F 11/14* (2006.01)
*G06F 16/21* (2019.01)

(52) U.S. Cl.
CPC ........ *G06F 11/1451* (2013.01); *G06F 16/219* (2019.01); *G06F 16/27* (2019.01);
(Continued)

(58) Field of Classification Search
CPC .... G06F 11/1451; G06F 16/219; G06F 16/27; G06F 2201/82; G06F 2201/80; G06F 2201/805
(Continued)

(56) References Cited

U.S. PATENT DOCUMENTS 4,626,829 A    12/1986 Hauck
5,381,545 A    1/1995 Baker et al.
(Continued)

OTHER PUBLICATIONS

Exhibit A-13 to Delphix Corp.'s Preliminary Invalidity and Non-Infringement Contentions "IBM ADSTAR Distributed Storage Manager ("ADSM")Tivoli Storage Manager as Prior Art to U.S. Pat. No. 6,732,244" 52 pages (Jul. 3, 2015).
(Continued)

*Primary Examiner* — Hicham Skhoun
(74) *Attorney, Agent, or Firm* — Honigman LLP; Brett A. Krueger

(57) ABSTRACT

Systems and methods for managing incremental data backups on an object store. A computing device receives first data representing a changed chunk of data in a revision of a data volume on a storage device, the changed chunk includes data having changes from previous data of a previous revision. The computing device creates a block of data representing a copy of the changed chunk on the object store, the object store also includes a previous revision block representing previous revision data. The computing device determines a previous index stored on the object store corresponding to the previous revision, which includes entries including at least one corresponding to the previous revision block. The computing device creates a copy of at least one previous index from the object store, and a revised index that updates the corresponding entry with updated entry data representing the change block.

20 Claims, 12 Drawing Sheets

Related U.S. Application Data

(60) Provisional application No. 62/565,683, filed on Sep. 29, 2017.

(52) U.S. Cl.
CPC .... *G06F 2201/80* (2013.01); *G06F 2201/805* (2013.01); *G06F 2201/82* (2013.01)

(58) Field of Classification Search
USPC .......................................................... 707/646
See application file for complete search history.

(56) References Cited

U.S. PATENT DOCUMENTS

| | | | |
|---|---|---|---|
| 5,410,667 A | 4/1995 | Belsan et al. | |
| 5,497,483 A | 3/1996 | Beardsley et al. | |
| 5,535,381 A | 7/1996 | Kopper | |
| 5,819,292 A | 10/1998 | Hitz et al. | |
| 5,828,876 A | 10/1998 | Fish et al. | |
| 5,857,208 A | 1/1999 | Ofek | |
| 5,963,962 A | 10/1999 | Hitz et al. | |
| 6,065,018 A | 5/2000 | Beier et al. | |
| 6,081,875 A | 6/2000 | Clifton et al. | |
| 6,119,208 A | 9/2000 | White et al. | |
| 6,131,148 A | 10/2000 | West et al. | |
| 6,148,412 A | 11/2000 | Cannon et al. | |
| 6,163,856 A | 12/2000 | Dion et al. | |
| 6,192,444 B1 | 2/2001 | White et al. | |
| 6,199,146 B1 | 3/2001 | Pence | |
| 6,202,071 B1 | 3/2001 | Keene | |
| 6,212,531 B1 | 4/2001 | Blea et al. | |
| 6,226,759 B1 | 5/2001 | Miller et al. | |
| 6,269,381 B1 | 7/2001 | St. Pierre et al. | |
| 6,269,431 B1 | 7/2001 | Dunham | |
| 6,324,548 B1 | 11/2001 | Sorenson | |
| 6,330,614 B1 | 12/2001 | Aggarwal et al. | |
| 6,434,681 B1 | 8/2002 | Armangau | |
| 6,460,055 B1 | 10/2002 | Midgley et al. | |
| 6,484,186 B1 | 11/2002 | Rungta | |
| 6,487,561 B1 | 11/2002 | Ofek et al. | |
| 6,557,089 B1 | 4/2003 | Reed et al. | |
| 6,625,704 B2 | 9/2003 | Winokur | |
| 6,654,772 B1 | 11/2003 | Crow et al. | |
| 6,654,912 B1 | 11/2003 | Viswanathan et al. | |
| 6,665,815 B1 | 12/2003 | Goldstein et al. | |
| 6,668,264 B1 | 12/2003 | Patterson et al. | |
| 6,772,302 B1 | 8/2004 | Thompson | |
| 6,779,094 B2 | 8/2004 | Selkirk et al. | |
| 6,823,336 B1 | 11/2004 | Srinivasan et al. | |
| 6,823,436 B2 | 11/2004 | Krishnamurthy | |
| 6,850,929 B2 | 2/2005 | Chang et al. | |
| 6,898,688 B2 | 5/2005 | Martin et al. | |
| 6,915,397 B2 | 7/2005 | Lubbers et al. | |
| 6,928,526 B1 | 8/2005 | Zhu et al. | |
| 6,948,039 B2 | 9/2005 | Biessener et al. | |
| 6,957,362 B2 | 10/2005 | Armangau | |
| 7,072,916 B1 | 7/2006 | Lewis et al. | |
| 7,143,251 B1 | 11/2006 | Patterson | |
| 7,222,194 B2 | 5/2007 | Kano et al. | |
| 7,325,111 B1 | 1/2008 | Jiang | |
| 7,346,623 B2 | 3/2008 | Prahlad et al. | |
| 7,386,695 B2 | 6/2008 | Fuente | |
| 7,428,657 B2 | 9/2008 | Yamasaki | |
| 7,647,355 B2 | 1/2010 | Best et al. | |
| 7,689,633 B1 | 3/2010 | Li et al. | |
| 7,707,184 B1 | 4/2010 | Zhang et al. | |
| 7,814,128 B2 | 10/2010 | Silvers et al. | |
| 7,937,547 B2 | 5/2011 | Liu et al. | |
| 3,037,032 A1 | 10/2011 | Pershin et al. | |
| 8,139,575 B2 | 3/2012 | Biran et al. | |
| 8,150,808 B2 | 4/2012 | Zha et al. | |
| 8,180,740 B1 | 5/2012 | Stager et al. | |
| 8,180,742 B2 | 5/2012 | Claudatos et al. | |
| 8,299,944 B2 | 10/2012 | Provenzano | |
| 8,407,191 B1 | 3/2013 | Nanda | |
| 8,706,833 B1 | 4/2014 | Bergant et al. | |
| 8,788,769 B2 | 7/2014 | Abercrombie et al. | |
| 8,924,425 B1 | 12/2014 | Pandey et al. | |
| 9,098,432 B1 | 8/2015 | Bachu et al. | |
| 2002/0129214 A1 | 9/2002 | Sarkar | |
| 2003/0101321 A1 | 5/2003 | Ohran | |
| 2003/0140070 A1 | 7/2003 | Kaczmarski et al. | |
| 2004/0199570 A1 | 10/2004 | Terao | |
| 2005/0066095 A1 | 3/2005 | Mullick et al. | |
| 2005/0165794 A1 | 7/2005 | Mosescu | |
| 2005/0246398 A1* | 11/2005 | Barzilai | G06F 11/1448 |
| 2006/0074945 A1 | 4/2006 | Mori | |
| 2009/0216816 A1 | 8/2009 | Basler et al. | |
| 2009/0222496 A1 | 9/2009 | Liu et al. | |
| 2010/0228919 A1 | 9/2010 | Stabrawa et al. | |
| 2011/0145494 A1 | 6/2011 | Mitsuma et al. | |
| 2011/0258161 A1 | 10/2011 | Constantinescu et al. | |
| 2012/0123999 A1 | 5/2012 | Ashutosh et al. | |
| 2012/0124307 A1 | 5/2012 | Ashutosh et al. | |
| 2016/0041880 A1 | 2/2016 | Mitkar et al. | |
| 2019/0034295 A1 | 1/2019 | Bourgeois et al. | |

OTHER PUBLICATIONS

Exhibit A-14 to Delphix Corp.'s Preliminary Invalidity and Non-Infringement Contentions "Green Designing a Fast On-line Backup System for a Log-structured File System as Prior Art to U.S. Pat. No. 6,732,244" 80 pages (Jul. 3, 2015).

Exhibit A-15 to Delphix Corp.'s Preliminary Invalidity and Non-Infringement Contentions "U.S. Pat. No. 5,535,381 as Prior Art to U.S. Pat. No. 6732244" 53 pages (Jul. 3, 2015).

Exhibit A-16 to Delphix Corp.'s Preliminary Invalidity and Non-Infringement Contentions "IBM RAMAC Virtual Array ("RAMAC" or "RVA") as Prior Art to U.S. Pat. No. 6,732,244" 68 pages (Jul. 3, 2015).

Exhibit A-17 to Delphix Corp.'s Preliminary Invalidity and Non-Infringement Contentions "The Episode File System ("Episode") as Prior Art to U.S. Pat. No. 6,732,244" 21 pages (Jul. 3, 2015).

Exhibit A-18 to Delphix Corp.'s Preliminary Invalidity and Non-Infringement Contentions, "Informix Storage Manager and Database Servers ("Informix") as Prior Art to U.S. Pat. No. 6,732,244," 34 pages (Jul. 3, 2015).

Exhibit A-19 to Delphix Corp.'s Preliminary Invalidity and Non-Infringement Contentions "U.S. Pat. No. 6779094 ("the '094 patent") as Prior Art to U.S. Pat. No. 6,732,244" 44 pages (Jul. 3, 2015).

Exhibit A-20 to Delphix Corp.'s Preliminary Invalidity and Non-Infringement Contentions "EMC NetWorkerLegato Networker ("Networker") as Prior Art to U.S. Pat. No. 6,732,244" 59 pages (Jul. 3, 2015).

Exhibit A-21 to Delphix Corp.'s Preliminary Invalidity and Non-Infringement Contentions "EMC TimeFinder as Prior Art to U.S. Pat. No. 6,732,244" 51 pages (Jul. 3, 2015).

Exhibit A-22 to Delphix Corp.'s Preliminary Invalidity and Non-Infringement Contentions "Retrospect as Prior Art to U.S. Pat. No. 6,732,244" 12 pages (Jul. 3, 2015).

Exhibit A-23 to Delphix Corp.'s Preliminary Invalidity and Non-Infringement Contentions, "U.S. Pat. No. 6,119,208 to White et al. ("White") as Prior Art to U.S. Pat. No. 6,732,244," 25 pages (Jul. 3, 2015).

Exhibit B-01 to Delphix Corp.'s Preliminary Invalidity and Non-Infringement Contentions, "Data Domain ("Data Domain") as Prior Art to U.S. Pat. No. 6,959,369," 10 pages (Jul. 3, 2015).

Exhibit B-02 to Delphix Corp.'s Preliminary Invalidity and Non-Infringement Contentions, "Hitachi ShadowImage ("ShadowImage") as Prior Art to U.S. Pat. No. 6,959,369," 10 pages (Jul. 3, 2015).

Exhibit B-03 to Delphix Corp.'s Preliminary Invalidity and Non-Infringement Contentions, "U.S. Pat. No. 6,269,431 as Prior Art to U.S. Pat. No. 6,959,369," 42 pages (Jul. 3, 2015).

Exhibit B-04 to Delphix Corp.'s Preliminary Invalidity and Non-Infringement Contentions "Green Designing a Fast On-line Backup System for a Log-structured File System as Prior Art to U.S. Pat. No. 6,959,369" 104 pages (Jul. 3, 2015).

(56) References Cited

OTHER PUBLICATIONS

Exhibit B-05 to Delphix Corp.'s Preliminary Invalidity and Non-Infringement Contentions, "U.S. Pat. No. 5,535,381 as Prior Art to U.S. Pat. No. 6,959,369," 84 pages (Jul. 3, 2015).
Exhibit B-06 to Delphix Corp.'s Preliminary Invalidity and Non-Infringement Contentions "Hutchinson as Claim Chart for U.S. Pat. No. 6,959,369" 80 pages (Jul. 3, 2015).
Exhibit B-07 to Delphix Corp.'s Preliminary Invalidity and Non-Infringement Contentions "U.S. Pat. No. 20030140070 ("the '070 application") as Prior Art to U.S. Pat. No. 6,959,369" 67 pages (Jul. 3, 2015).
Exhibit B-08 to Delphix Corp.'s Preliminary Invalidity and Non-Infringement Contentions "U.S. Pat. No. 6,898,688 as Prior Art to U.S. Pat. No. 6,959,369" 53 pages (Jul. 3, 2015).
Exhibit B-09 to Delphix Corp.'s Preliminary Invalidity and Non-Infringement Contentions "U.S. Pat. No. 6,434,681 as Prior Art to U.S. Pat. No. 6,959,369" 44 pages (Jul. 3, 2015).
Exhibit B-10 to Delphix Corp.'s Preliminary Invalidity and Non-Infringement Contentions "U.S. Pat. No. 7,072,916 ("the '916 patent") as Prior Art to U.S. Pat. No. 6,959,369" 59 pages (Jul. 3, 2015).
Exhibit B-11 to Delphix Corp.'s Preliminary Invalidity and Non-Infringement Contentions, "Chervenak as Prior Art to U.S. Pat. No. 6,959,369," 69 pages (Jul. 3, 2015).
Exhibit B-12 to Delphix Corp.'s Preliminary Invalidity and Non-Infringement Contentions "IBM ADSTAR Distributed Storage Manager ("ADSM")Tivoli Storage Manager as Prior Art to U.S. Pat. No. 6,959,369" 54 pages (Jul. 3, 2015).
Exhibit B-13 to Delphix Corp.'s Preliminary Invalidity and Non-Infringement Contentions, "Petal: Distributed Virtual Disks (Lee) as Prior Art to U.S. Pat. No. 6,959,369," 51 pages (Jul. 3, 2015).
Exhibit B-14 to Delphix Corp.'s Preliminary Invalidity and Non-Infringement Contentions "U.S. Pat. No. 6,915,397 ("the '397 patent") as Prior Art to U.S. Pat. No. 6,959,369" 94 pages (Jul. 3, 2015).
Exhibit B-15 to Delphix Corp.'s Preliminary Invalidity and Non-Infringement Contentions "IBM RAMAC Virtual Array ("RAMAC" or "RVA") as Prior Art to U.S. Pat. No. 6,959,369" 89 pages (Jul. 3, 2015).
Exhibit B-16 to Delphix Corp.'s Preliminary Invalidity and Non-Infringement Contentions, "Symantec NetBackup/Veritas NetBackup ("NetBackup") as Prior Art to U.S. Pat. No. 6,959,369," 65 pages (Jul. 3, 2015).
Exhibit B-17 to Delphix Corp.'s Preliminary Invalidity and Non-Infringement Contentions "EMC NetWorkerLegato Networker ("Networker") as Prior Art to U.S. Pat. No. 6,959,369" 92 pages (Jul. 3, 2015).
Exhibit B-18 to Delphix Corp.'s Preliminary Invalidity and Non-Infringement Contentions, "Retrospect as Prior Art to U.S. Pat. No. 6,959,369," 35 pages (Jul. 3, 2015).
Exhibit B-19 to Delphix Corp.'s Preliminary Invalidity and Non-Infringement Contentions, "EMC TimeFinder as Prior Art to U.S. Pat. No. 6,959,369," 90 pages (Jul. 3, 2015).
Exhibit B-20 to Delphix Corp.'s Preliminary Invalidity and Non-Infringement Contentions, "Informix Storage Manager and Database Servers ("Informix") as Prior Art to U.S. Pat. No. 6,959,369," 70 pages (Jul. 3, 2015).
Exhibit B-21 to Delphix Corp.'s Preliminary Invalidity and Non-Infringement Contentions "NetApp Data Protection Solution ("NetApp") as Prior Art to U.S. Pat. No. 6,959,369" 58 pages (Jul. 3, 2015).
Exhibit B-22 to Delphix Corp.'s Preliminary Invalidity and Non-Infringement Contentions "U.S. Pat. No. 6,119,208 to White et al. ("White") as Prior Art to U.S. Pat. No. 6,959,369" 43 pages (Jul. 3, 2015).
Friess et al., "Windows NT Backup and Recovery with ADSM," IBM, Redbooks, 190 pages (May 1998).
Galli, "Journal File Systems in Linux," Upgrade, The European Online Magazine for the IT Professional, vol. 2, No. 6, 8 pages (Dec. 2001).
Garrett et al., "Syncsort Backup Express and NetApp: Advanced Data Protection and Disaster Recovery," Enterprise Strategy Group, 19 pages (Jan. 2009).
Gordon, "High Noon-Backup and Recovery: What Works, What Doesn't and Why," Enterprise Systems Journal, vol. 15, No. 9, 5 pages (Sep. 2000).
Green et al., "Designing a Fast, On-Line Backup System for a Log-Structured File System," Digital Technical Journal, vol. 8, No. 2, pp. 32-45 (1996).
Gu et al., "DB2 UDB Backup and Recovery with ESS Copy Services," IBM, Redbooks, 144 pages (Aug. 2002).
Hendricks et al. "Improving Small File Performance in Object-Based Storage" Parallel Data Laboratory Carnegie Mellon University Pittsburgh Pennsylvania 21 pages (May 2006).
Herrin II and Finkel, "The Viva File System," <http://www.cs.wisc.edu/~shankar/Viva/viva.html>, 26 pages (Jun. 14, 1997).
Heyt et al., "Tivoli Storage Manager Version 3.7: Technical Guide," IBM, Redbooks, Dec. 248 pages (1999).
Hitz et al., "File System Design for an NFS File Server Appliance," Network Appliance, 23 pages (Jan. 19, 1994).
Holton et al., "XFS: A Next Generation Journalled 64-Bit Filesystem with Guaranteed Rate I/O," <http://www.sgi.com/Technology/xfs-whitepaper.html>, 15 pages (Jun. 5, 1997).
Hutchinson, "Logical vs. Physical File System Backup," Usenix Association, Proceedings of the 3rd Symposium on Operating Systems Design and Implementation, New Orleans, Louisiana, 12 pages (Feb. 1999).
"IBM RAMAC Virtual Array" Redbooks © International Business Machines Corporation 490 pages (Jul. 1997).
"Setting Up and Implementing ADSTAR Distributed Storage Manager400" © International Business Machines Corporation 350 pages (Mar. 1995).
"Informix Backup and Restore Guide," © Informix Corporation, 280 pages (Dec. 1999).
"Informix Storage Manager: Administrator's Guide," © Informix Corporation, 166 pages (Dec. 1999).
Innovation Data Processing, "FDR InstantBackupTM . . . Innovation Instant Solutions," 2 pages.
"Veritas File System 4.1 Administrator's Guide," © Hewlett-Packard Development Company L.P., 270 pages (May 2005).
"Veritas FlashSnap Point-in-Time Copy Solutions," Administrator's Guide 4.1, © VERITAS Software Corporation, 102 pages (Apr. 2006).
"Veritas NetBackupTM 4.5 for Informix: System Administrator's Guide," © VERITAS Software Corporation, 94 pages (Mar. 2002).
"Veritas NetBackupTM 4.5: User's Guide," © VERITAS Software Corporation, 212 pages (Mar. 2002).
Vmware, "Vmware Consolidated Backup: Best Practices and Deployment Considerations for SAN Environments," https://web.archive.org/web/20080804070141/http://www.vmware.com/files/pdf/vcb_best_practices, 39 pages.
Wolf, "VM Backup Bliss? The State of VM Data Protection in the Enterprise," Burton Group, Midvale, Utah, 45 pages (Aug. 1, 2007).
You et al., "Deep Store: An Archival Storage System Architecture," Proceedings of the 21st International Conference on Data Engineering, 12 pages (2005).
Zhang et al., "?FS: A Journaling File System Design for Handling Large Data Sets with Reduced Seeking," Usenix Association, Proceedings of FAST '03: 2nd Usenix Conference on File and Storage Technologies, San Francisco, California, 15 pages (Mar. 31-Apr. 2, 2003).
Zhu et al., "Avoiding the Disk Bottleneck in the Data Domain Deduplication File System," Proceedings of the 6th Usenix Conference on File and Storage Technologies FAST 2008, San Jose, California, 14 pages (2008).
Isilon Systems, "Backup and Recovery with Isilon IQ Clustered Storage," 19 pages (Aug. 2007).
Kara "Ext4 btrfs and the others" Linux-Kongress The International Linux System Technology Conference 15 pages (Oct. 30, 2009).
Keeton et al., "A Framework for Evaluating Storage System Dependability, Proceedings of the 2004 International Conference on Dependable Systems and Networks," 10 pages (2004).

(56) References Cited

OTHER PUBLICATIONS

Kim et al., "Volume Management in SAN Environment," IEEE, pp. 500-505 (2001).

Klivansky, "A Thorough Introduction to FlexCloneTM Volumes," Network Appliance, Inc., 35 pages (Oct. 2004).

Klosterman, "Delayed Instantiation Bulk Operations for Management of Distributed, Object-Based Storage Systems," Department of Electrical and Computer Engineering, Carnegie Mellon University, Pittsburgh, Pennsylvania, 255 pages (Aug. 2009).

Kulkarni et al., "Redundancy Elimination Within Large Collections of Files," Usenix Association, Proceedings of the General Track: 2004 Usenix Annual Technical Conference, Boston, MA, 15 pages (Jun. 27-Jul. 2, 2004).

Lee et al., "A Comparison of Two Distributed Disk Systems," Systems Research Center, Palo Alto, California, 25 pages (Apr. 30, 1998).

Lee et al., "Petal: Distributed Virtual Disks," ACM, pp. 84-92 (1996).

Legato, "Legato NetWorker Release 6.1 UNIX Version: Administrator's Guide," 638 pages (2001).

Leins et al., "Tivoli Storage Manager Version 3.7.3 & 4.1: Technical Guide," IBM, Redbooks, 368 pages (Sep. 2000).

Linett et al., "The Real Problems of Backup," Fourth NASA Goddard Conference on Mass Storage Systems and Technologies, College Park, Maryland, 13 pages (Mar. 28-30, 1995).

Merrill et al., "SnapVault Best Practices Guide," © 2008 NetApp, 29 pages.

Mesnier et al., "Object-Based Storage," IEEE Communications Magazine, pp. 84-90 (Aug. 2003).

Mesnier et al. "Object-Based Storage" IEEE Potentials pp. 31-34 (Apr. May 2005).

Milligan et al., "Simplifying Management of Complex Business Operations (A Study of Mainline Storage Virtualization)," CMG 2001 Proceedings, vol. 2, 13 pages (Dec. 2-7, 2001).

Mortimer et al., "ADSM Version 3 Technical Guide," IBM, Redbooks, 384 pages (Dec. 1998).

Mortimer et al., "Using ADSM to Back Up Databases," IBM, Redbooks, 618 pages (Jul. 1998).

Mullender et al., "Immediate Files," Software—Practice and Experience, vol. 14, No. 4, pp. 365368 (Apr. 1984).

Muller et al., "A High Performance Multi-Structured File System Design," ACM, pp. 56-67 (1991).

Mushran "OCFS2: A Cluster File System for Linux: User's Guide for Release 1.4" 44 pages (Jul. 2008).

Muthitacharoen et al., "A Low-Bandwidth Network File System," ACM, 174-187 (2001).

NetApp, Inc., "Data ONTAP® 7.3 Data Protection: Online Backup and Recovery Guide," 405 pages (Jun. 2008).

NetApp Inc. "Data ONTAP® 7.3 System Administration Guide" 349 pages (Nov. 2010).

Network Appliance Inc. "Data ONTAP 10.0: Architecture Basic Concepts Guide" 18 pages (Nov. 2006).

Network Appliance, Inc., "Data ONTAPTM 6.3 Command Reference," Network Appliance, Inc., Sunnyvale, California, 452 pages (Aug. 2002).

Network Appliance, Inc., "Network ApplianceTM SnapMirror® Software," 2 pages (2006).

Network Appliance Inc. "SnapManager® 2.1 for Oracle® Installation and Administration Guide" 272 pages (Apr. 2007).

Osuna et al., "Data Protection Strategies in IBM System Storage N Series," IBM, Redbooks, 90 pages (Jun. 2008).

Osuna et al., "IBM System Storage N Series SnapMirror," IBM, Redbooks, 124 pages (Jul. 2006).

Pate et al., "Implementing Snapshot," IBM, Redbooks, 214 pages (Jul. 1999).

Pate et al., "RAMAC Virtual Array, Peer-to-Peer Remote Copy, and IXFP/SnapShot for VSE/ESA," IBM, Redbooks, 84 pages (Jan. 1999).

Pate et al., "RAMAC Virtual Array: Implementing Peer-to-Peer Remote Copy," IBM, Redbooks, 140 pages (Dec. 1998).

Patterson et al., "SnapMirror®: File System Based Asynchronous Mirroring for Disaster Recovery," Usenix Association, Proceedings of the FAST 2002 Conference on File and Storage Technologies, Monterey, California, 14 pages (Jan. 28-30, 2002).

Petition for Inter Partes Review of U.S. Pat. No. 8,299,944 Under 35 U.S.C. §§ 311-319 and 37 C.F.R. §§ 42.1-.80, 42.100-.123, 43 pages (Aug. 6, 2015).

Petition for Inter Partes Review of U.S. Pat. No. 8,788,769 Under 35 U.S.C. §§ 311-319 and 37 C.F.R. §§ 42.1-.80, 12.100-.123, 71 pages Aug. 7, 2015 (Aug. 7, 2015).

Phillips "Zumastor Linux Storage Server" Proceedings of the Linux Symposium vol. 2 Ottawa Ontario Canada 14 pages (Jun. 27-30, 2007).

Prahlad et al., "Method for Managing Snapshots Generated by an Operating System or Other Application," U.S. Appl. No. 60/326,021, 16 pages (Sep. 28, 2001).

Quinlan et al., "Venti: A New Approach to Archival Storage," Usenix Association, Proceedings of the FAST 2002 Conference on File and Storage Technologies, Monterey, California, 14 pages (Jan. 28-30, 2002).

Sadagopan et al., "NetApp Technical Report: Oracle Fusion Middleware DR Solution Using NetApp Storage," NetApp., 38 pages (May 2008).

Sarkar, "Instant Image: Transitive and Cyclical Snapshots in Distributed Storage Volumes," Euro-Par 2000, pp. 1284-1291 (2000).

Schuettinger et al., "Helping DBAs Become More Efficient: NetApp Efficiency and Manageability Advantages," NetApp, Inc., 12 pages (Jul. 2009).

Solter et al., "OpenSolarisTM Bible," Wiley Publishing, Inc., Indianapolis, Indiana, 9 pages (2009).

Sweeney, "xFS In-core Inode Management," <http://linux-xfs.sgi.com/projects/xfs/design_docs/>, 10 pages (Nov. 29, 1993).

"Symantec Backup Exec Quick Recovery & Off-Host Backup Solutions for Microsoft Exchange Server 2003 & Microsoft SQL Server" Symantec Corporation White Paper, 9 pages (2005).

"Near-Instant Oracle Cloning with Syncsort AdvancedClient Technologies" Syncsort Incorporated White Paper 12 pages (2007).

Syncsort Incorporated "Syncsort Backup Express Advanced Recovery for NetApp" 12 pages; (2008).

Tate et al., "Implementing the IBM System Storage SAN Volume Controller V4.3," IBM, Redbooks, 970 pages (Oct. 2008).

Thekkath et al. "Frangipani: A Scalable Distributed File System" Proceeding SOSP '97 Proceedings of the Sixteenth ACM Symposium on Operating Systems Principles 25 pages (1997).

Tretau et al., "IBM TotalStorage NAS Backup and Recovery Solutions," IBM, Redbooks, 226 pages (Jul. 2002).

Alapati, "SnapMirror Sync and SnapMirror Semi-Sync Overview and Design Considerations," NetApp Technical Report, 24 pages (Jul. 2010).

"StorTrendsManageTrends® (Version 2.7) User's Guide for the StorTends 1300 Storage Appliance" © American Megatrends Inc. 378 pages (Mar. 23, 2009).

Arrell et al., "Using RVA and Snapshot for Business Intelligence Applications with OS/390 and DB2," IBM, Redbooks, Aug. 70 pages (1998).

Azagury et al., "Point-in-Time Copy: Yesterday, Today and Tomorrow," IBM Research Lab in Haifa, pp. 259-270 (2002).

Baird, "Virtual Storage Architecture Guide (VSAG)," IEEE, pp. 312-326 (1995).

Baker, "Disk-Based Mirroring is a Lot More Than Just Safe," Computer Technology Review, pp. 55-57 (2000).

Brown et al., "SnapMirror and SnapRestore: Advances in Snapshot Technology," <https://web.archive.org/web/20011126183455/http://www.netapp.com/tech_library/3043.html>, 13 pages.

Cederqvist et al., "Version Management with CVS," 122 pages (1992).

Chang et al., "Performance Analysis of Two Frozen Image Based Backup/Restore Methods," IEEE International Conference on Electron Information Technology 2005, 7 pages (May 22-25, 2005).

Chapman et al. "SnapMirror® Best Practices Guide" Network Appliance Inc. 63 pages (Apr. 2006).

(56) References Cited

OTHER PUBLICATIONS

Chatterjee et al., "Efficient Replication Leveraging Information Lifecycle Management in Data Storage Systems," Provisional Patent Application, 25 pages (filed Feb. 9, 2009).
Chervenak et al., "Protecting File Systems: A Survey of Backup Techniques," Sixth Goddard Conference on Mass Storage Systems and Technologies, Fifteenth IEEE Symposium on Mass Storage Systems, College Park, Maryland, Mar. 23-26, 17 pages (1998).
Chutani et al., "The Episode File System," Usenix Association, Proceedings of the Winter 1992 Usenix Conference, San Francisco, California, 19 pages (Jan. 20-24, 1992).
"CommVault® Simpana® Quick Recovery® Software for Critical Data Center Applications and File Systems" © CommVault Systems Inc. 35 pages (2010).
Dantz Development Corporation, "Retrospect® User's Guide," 262 pages (2002).
Datamonitor, "Network Appliance Adds SnapRestore, SnapMirror to OnTap," Computergram International, 2 pages (Apr. 26, 1999).
Degwekar, "Using SnapMirror® with SnapDrive® for Unix®," 11 pages (2007).
Delphix Corp.'s Invalidity Contentions Under Patent L.R. 3-3, 27 pages (Jul. 24, 2014).
Edwards et al., "Flex Vol: Flexible, Efficient File Volume Virtualization in WAFL," Usenix Association, Usenix '08: 2008 Usenix Annual Technical Conference, pp. 129-142 (2008).
"Backup of Oracle in EMC Symmetrix Environments with EMC NetWorker PowerSnap," EMC Corporation White Paper, 25 pages (Aug. 2008).
EMC, "EMC Celerra Version 5.6 Technical Primer: SLA-Driven Replication with Celerra Replicator (V2): Technology Concepts and Business Considerations," 20 pages (Jul. 2008).
EMC, "EMC Corporation TimeFinder Product Description Guide," 34 pages (1998).
EMC, "EMC DL1500 and DL3000 with EMC NetWorker: Best Practices Planning," 36 pages (Jul. 2009).
EMC, "Next-Generation Backup-to-Disk: Building the Foundation for Effective Operational Recovery Management," 9 pages (Jan. 31, 2005).
EMC, "Unified Backup and Recovery with EMC NetWorker," 16 pages (Mar. 2010).
Exhibit 1004 IPR2015-01689 Declaration of Ellie Young 24 pages (Aug. 5, 2015).
Exhibit 1006 IPR2015-01678 Pfaffenberger Webster's New World Computer Dictionary Ninth Edition Hungry Minds Inc. New York New York 4 pages (2001).
Exhibit 1006 IPR2015-01689, File History for U.S. Appl. No. 12/947,393, filed Nov. 16, 2010, 108 pages.
Exhibit 1006v2 IPR2015-01689 Version 2 File History for U.S. Appl. No. 12/947,393, filed Nov. 16, 2010 (177 pages).
Exhibit 1006v3 IPR2015-01689 Version 3 File History for U.S. Appl. No. 12/947,393, filed Nov. 16, 2010 (150 pages).
Exhibit 1006v4 IPR2015-01689 Version 4 File History for U.S. Appl. No. 12/947,393, filed Nov. 16, 2010 (98 pages).
Exhibit 1007 IPR2015-01678, Microsoft Computer Dictionary Fourth Edition, Microsoft Press, Redmond, Washington, 3 pages (1999).
Exhibit 1007 IPR2015-01689 Declaration of Prashant Shenoy Ph.D. in Support of Petition for Inter Partes Review 82 pages (Aug. 5, 2015).
Exhibit 1008 IPR2015-01678, File History for U.S. Appl. No. 12/947,438, filed Nov. 16, 2010, (100 pages).
Exhibit 1008v2 IPR2015-01678 Version 2 File History for U.S. Appl. No. 12/947,438, filed Nov. 16, 2010 (103 pages).
Exhibit 1009 IPR2015-01678 Declaration of Prashant Shenoy Ph.D. in Support of Petition for Inter Partes Review 58 pages (Aug. 5, 2015).
Exhibit 1010 IPR2015-01678, Rivest, "The MD5 Message-Digest Algorithm," <https://www.ietf.org/rfc/rfc1321.txt>, 20 pages (Apr. 1992).
Exhibit 1011 IPR2015-01678, "Secure Hash Standard," U.S. Department of Commerce, Technology Administration, National Institute of Standards and Technology, FIPS PUB 180-1, Federal Information Processing Standards Publication, Apr. 17, 24 pages (1995).
Exhibit A-01 to Delphix Corp.'s Preliminary Invalidity and Non-Infringement Contentions, "Data Domain ("Data Domain") as Prior Art to U.S. Pat. No. 6,732,244," 7 pages (Jul. 3, 2015).
Exhibit A-02 to Delphix Corp.'s Preliminary Invalidity and Non-Infringement Contentions, "Symantec NetBackup/Veritas NetBackup ("NetBackup") as Prior Art to U.S. Pat. No. 6,732,244," 7 pages (Jul. 3, 2015).
Exhibit A-03 to Delphix Corp.'s Preliminary Invalidity and Non-Infringement Contentions, "Hitachi ShadowImage ("ShadowImage") as Prior Art to U.S. Pat. No. 6,732,244," 7 pages (Jul. 3, 2015).
Exhibit A-04 to Delphix Corp.'s Preliminary Invalidity and Non-Infringement Contentions, "U.S. Pat. No. 6,269,431 as Prior Art to U.S. Pat. No. 6,732,244," 27 pages (Jul. 3, 2015).
Exhibit A-05 to Delphix Corp.'s Preliminary Invalidity and Non-Infringement Contentions "U.S. Pat. No. 6,915,397 ("the '397 patent") as Prior Art to U.S. Pat. No. 6,732,244" 44 pages (Jul. 3, 2015).
Exhibit A-06 to Delphix Corp.'s Preliminary Invalidity and Non-Infringement Contentions, "Hutchinson as Claim Chart for U.S. Pat. No. 6,732,244," 64 pages (Jul. 3, 2015).
Exhibit A-07 to Delphix Corp.'s Preliminary Invalidity and Non-Infringement Contentions "Petal: Distributed Virtual Disks (Lee) as Prior Art to U.S. Pat. No. 6,732,244" 35 pages (Jul. 3, 2015).
Exhibit A-08 to Delphix Corp.'s Preliminary Invalidity and Non-Infringement Contentions, "EMC TimeFinder as Prior Art to U.S. Pat. No. 6,732,244," 51 pages (Jul. 3, 2015).
Exhibit A-09 to Delphix Corp.'s Preliminary Invalidity and Non-Infringement Contentions "U.S. Pat. No. 6,434,681 as Prior Art to U.S. Pat. No. 6,732,244" 19 pages (Jul. 3, 2015).
Exhibit A-10 to Delphix Corp.'s Preliminary Invalidity and Non-Infringement Contentions "U.S. Pat. No. 7,072,916 ("the '916 patent") as Prior Art to U.S. Pat. No. 6,732,244" 65 pages (Jul. 3, 2015).
Exhibit A-11 to Delphix Corp.'s Preliminary Invalidity and Non-Infringement Contentions, "U.S. Pat. No. 6,898,688 as Prior Art to U.S. Pat. No. 6,732,244," 35 pages (Jul. 3, 2015).
Exhibit A-12 to Delphix Corp.'s Preliminary Invalidity and Non-Infringement Contentions "Chervenak as Prior Art to U.S. Pat. No. 6,732,244" 21 pages (Jul. 3, 2015).

* cited by examiner

INCREMENTAL VAULT TO OBJECT STORE

CROSS REFERENCE TO RELATED APPLICATIONS

This U.S. patent application is a continuation of, and claims priority under 35 U.S.C. § 120 from, U.S. patent application Ser. No. 16/148,887, filed on Oct. 1, 2018, which claims priority under 35 U.S.C. § 119(e) to U.S. Provisional Application 62/565,683, filed on Sep. 29, 2017. The disclosures of these prior applications are considered part of the disclosure of this application and are hereby incorporated by reference in their entireties.

TECHNICAL FIELD

The present disclosure relates generally to storing and accessing data in an object store. Specifically, the present disclosure relates to managing revisions to data in an object store.

BACKGROUND

Backup and archiving systems are increasingly using object storage for long term retention. Object storage may be public or private cloud or local on premise. Examples of object storage are: Google Cloud Storage, Scality RING; IBM Cleversafe; Amazon S3.

Object storage has advantages over traditional block or file storage including high reliability, arbitrary scalability (so no limit on number of items stored, or number of revisions), high transfer speeds, and low TCO (total cost of ownership) per-terabyte. Compared to block storage, object storage introduces challenges of, high data transfer cost, large addressable unit size, slow access times. Compared to file storage, object storage introduces challenges of immutability of addressable units, lack of sophisticated storage services (such as snapshots, replication), slow access times.

SUMMARY

In accordance with the disclosed subject matter, systems, methods, and non-transitory computer-readable media are provided for enabling management of incremental data backups on an object store.

In some implementations, the disclosed subject matter includes a method for receiving, by a computing device, first data representing a changed chunk of data in a revision of a data volume stored on a storage device, the changed chunk of data including data having changes from previous data of a previous revision of the data volume, wherein the at least one changed chunk is stored on the storage device in a format associated with the storage device. In some implementations, a computing device creates a block of data representing a copy of the changed chunk of data on the object store as object data, wherein the object store further includes a previous revision block of data representing previous revision data of the data volume stored as object data. In some implementations, the computing device determines a previous index stored on the object store corresponding to the previous revision of the data volume, the previous index including at least one index page having entries, at least one entry corresponding to the previous revision block of data stored on the object store. In some implementations, the computing device creates a copy of at least one previous index page of the previous index from the object store. In some implementations, the computing device creates a revised index corresponding to the revision of the data volume, wherein creating the revised index includes: the computing device determining the entry in the revised index page corresponding to the previous revision block of data, and the computing device updating the entry with updated entry data representing the change block of data, such that the revision of the data volume is retrievable from the object store using the revised index.

In some implementations, the changed block of data is a compressed version of the changed chunk of data. In some implementations, creating the revised index further includes the computing device storing the revised index in the object store. In some implementations, index entries in the revised index, corresponding to unchanged blocks of data representing chunks of data in the revision of the data volume that are unchanged since the previous revision, are the same as corresponding index entries in the previous index.

In some implementations, the computing device restores the revision of data stored on the object store to the storage device, wherein restoring the revision. In some implementations, the computing device receives a request to restore the revision stored on the object store to the storage device. In some implementations, the computing device retrieves the revised index corresponding to the revision and an earlier index corresponding to an existing revision of the data volume on the storage device. In some implementations, the computing device identifies a set of changed blocks stored on object store corresponding to entries in the revised index, the set of changed blocks being blocks of data representing data that that have changed since the existing revision of the data volume on the storage device. In some implementations, the computing device retrieves the set of changed blocks. In some implementations, the set of changed blocks corresponds to index entries in the revised index that differ from the corresponding index entries in the earlier index. In some implementations, the computing device copies the set of changed blocks to the storage device thereby restoring the storage device to the revision of data. In some implementations, the computing device mounts requested blocks of the set of changed blocks such that they are accessible by the storage device, thereby accomplishing an on-demand restore of the revision of data.

In some implementations, the computing device deletes the revision of data stored on the object store to the storage device. In some implementations, the comping device receives a request to delete the revision stored on the object store. In some implementations, the comping device retrieves the revised index, the previous index, and a subsequent index corresponding to a subsequent revision of the data volume on the storage device. In some implementations, the comping device determines deletable blocks of data by comparing index entries in the revised index to corresponding index entries in the previous index and the subsequent index, the deletable blocks of data having corresponding index entries in the revised index that differ from corresponding data entries in the previous index and the subsequent index. In some implementations, the comping device deletes the deletable blocks of data.

In some implementations, the computing device calculates a space reclamation amount of a delete of the revision of data stored on the object store to the storage device. In some implementations, the computing device receives a request to calculating the space reclamation amount of a delete of the revision of data stored on the object store. In some implementations, the computing device retrieves the revised index, the previous index, and a subsequent index corresponding to a subsequent revision of the data volume on the storage device. In some implementations, the computing device determines deletable blocks of data by comparing index entries in the revised index to corresponding index entries in the previous index and the subsequent index, the deletable blocks of data having corresponding index entries in the revised index that differ from corresponding data entries in the previous index and the subsequent index. In some implementations, the computing device calculates a size of each of the deletable blocks of data. In some implementations, the computing device calculates a size of metadata corresponding to the deletable blocks. In some implementations, the computing device calculates the space reclamation amount by adding the sizes of each of the deletable blocks of data and the metadata.

In some implementations, the computing device updates the retention policies for data blocks in the object sore corresponding to entries in the revised index. In some implementations, the retention policy is write once read many (WORM) protection.

These and other capabilities of the disclosed subject matter will be more fully understood after a review of the following figures, detailed description, and claims. It is to be understood that the phraseology and terminology employed herein are for the purpose of description and should not be regarded as limiting.

DESCRIPTION OF DRAWINGS

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Copy data management systems are used in enterprises to manage first and subsequent copies of system and application data, for backup, business continuity, disaster recovery, archiving, test, analysis and other purposes.

Adoption of object storage for long term retention by copy data management systems faces several challenges:

Object storage provides no native facility to define a revision of a volume as a reference to an original, plus delta change (i.e., only the blocks of data that have been changed).

This exacerbates the high cost of object storage, as each revision of a volume requires a full copy to be made, even for a small percentage change.

Typically, with object storage, the time taken to make a revision is high, as the whole object needs to be written, not just the changed sections, even for a small percentage change.

Implementations of the present disclosure addresses these problems via a system where volumes (e.g., disk or LUN images, of size 100-10,000 GB) are broken into small pages (e.g., of size 64-8096 KB) each of which is stored separately in object storage. Each volume can have multiple point-in-time snapshots, or revisions, kept in object storage. Each revision of a volume can have an index that references a set of data pages. The index can be kept in object storage. Data pages, or entries in data pages, common to multiple revisions can be referenced from multiple indexes and therefore shared between revisions.

Systems and methods are disclosed for providing mechanisms to create a new revision via modifications to an earlier revision; to delete intermediate revisions, immediately reclaiming any object storage that is no longer referenced; and to calculate the amount of storage that would potentially be freed up by deleting a revision. The term "data volume" as used herein refers to a full data volume, or parts of a data volume.

Figure 1:
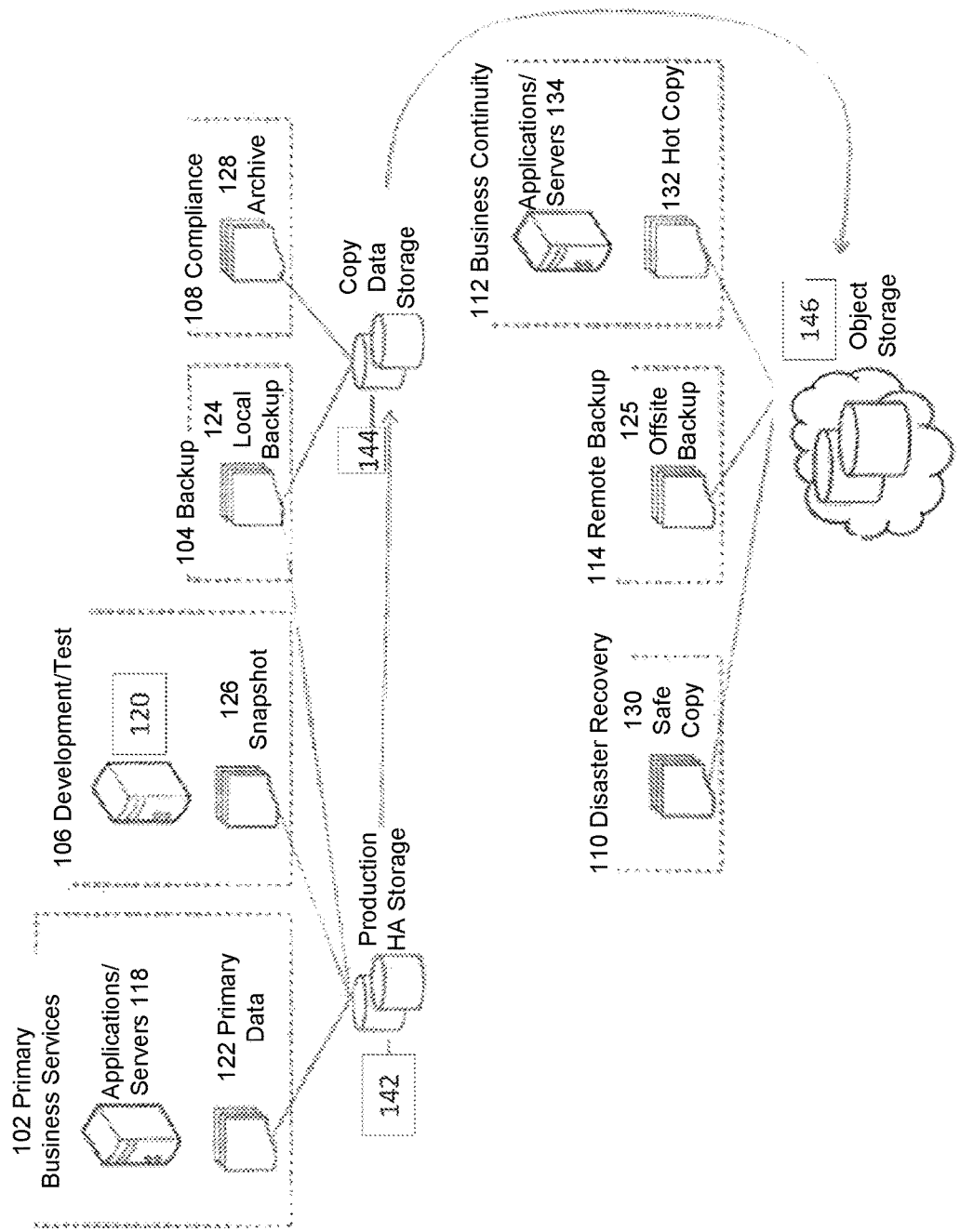
FIG. 1 shows how a data management system can address lifecycle requirements of data.

FIG. 1 shows how a data management system can address lifecycle requirements of data. FIG. 1 shows primary business services 102 (including applications/servers 118 and primary data 112), development/test pool 106 (having applications/servers 120 and snapshots 126), backup pool 104 (having local backup 124), and compliance pool 108 (having archive 128). FIG. 1 also shows production storage 142 for production and copy data storage 144 to store copies of production data. FIG. 1 also shows disaster recovery pool 110 (having safe copy 130), business continuity pool 112 (having offsite backup 125), and remote backup pool 114 (having hot copy 132). The disaster recovery pool 110, business continuity pool 112, and remote backup pool 114 can be on object storage 146. In certain implementations, production storage 142 can be structured as a file system, copy data storage 144 can be structured as block data, and object storage 146 can be structured as object data. In some implementations, a copy data management system, which will be described in more detail below, manages data movement between application, storage pools, and secondary storage.

As shown in FIG. 1, primary data 122 is stored on production storage (such as, for example, HA (High Availability) storage) 142, and accessed by primary business services 102. The copy data system 100 is responsible for managing snapshots 126 of production data for development & test services 106; and for making first full copies of data into copy-data storage 144 for backup 104 services and archive 128 for compliance services 108. Additional copies are made to local or remote object storage 146 where a single copy can be purposed as a safe copy 130 for disaster recovery 110, offsite backup 125 for remote backup or hot standby 132 for business continuity. Access points to copy data 118, 120, and 134 include copy data that can be accessed by, for example, enterprise applications. Examples of the applications which can create and access data include Oracle databases, media applications like Final Cut Pro, or Exchange email, among others.

Figure 2:
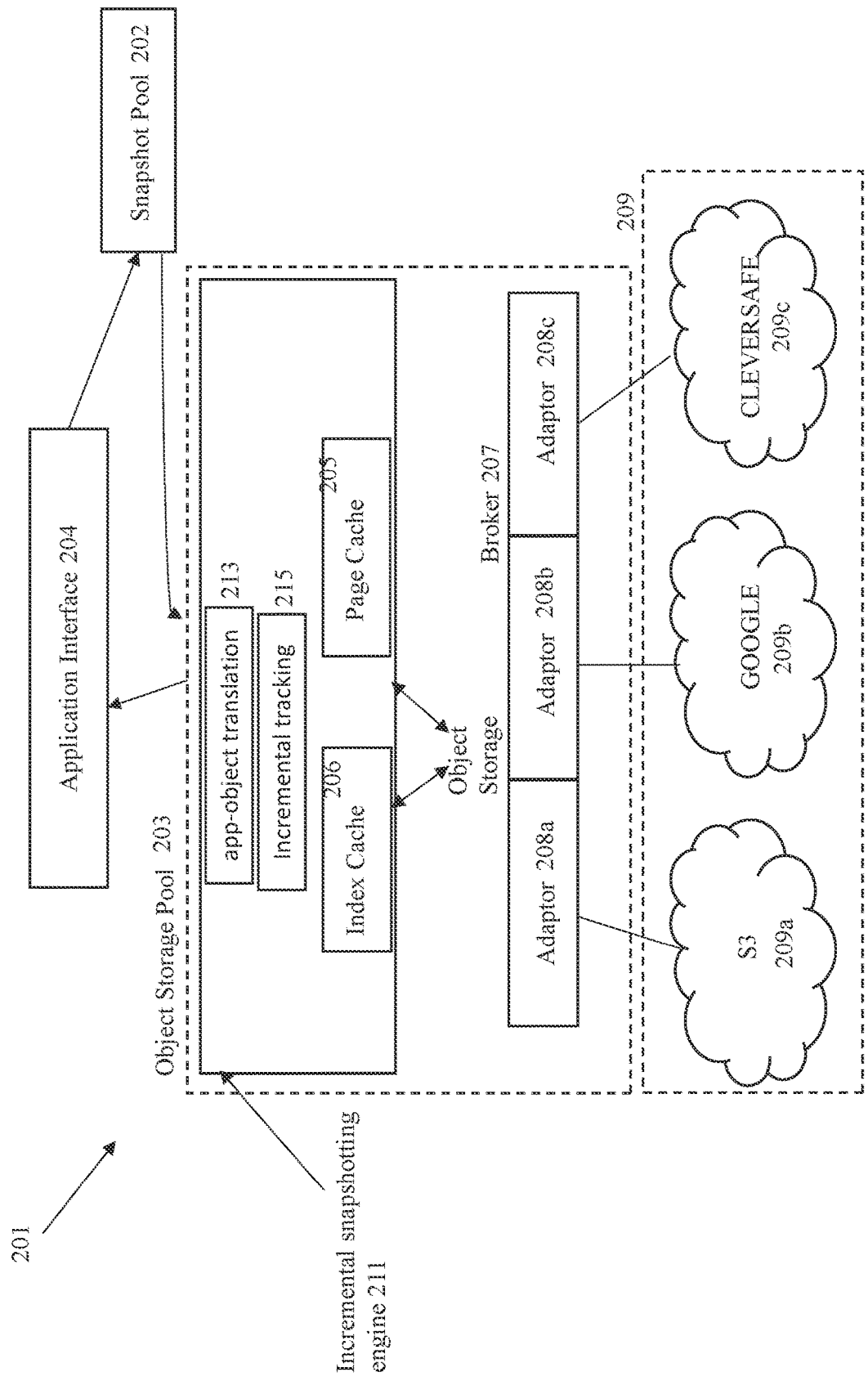
FIG. 2 is a diagram of copy data management system, according to some implementations of the present disclosure.

FIG. 2 is a diagram of copy data management system 201, according to some implementations of the present disclosure. FIG. 2 shows copy data management system 201 including object storage pool 203. The object storage pool 203 includes incremental snapshotting engine 211 having application-object translation 213, incremental tracking 215, and page cache 205, and index cache 206. It also includes adaptors 208a-208c that interface from the page cache 205 and index cache 206 to object storage 209 (e.g., 209a-209c), for example, broker 207. Copy data management system 201 also includes application interface 204 and snapshot pool 202.

In certain implementations, the copy data management system 201 includes an object storage pool 203. In certain implementations, the object storage pool 203 resides in copy data storage 144 and communicates with the object storage 146. Object storage pool 203 and snapshot pool 202 both store data in native form, and expose it via read/write application interfaces 204 to application servers 120. An example of a copy data management system and its interactions with a snapshot pool are described in more detail in U.S. Patent Publication No. 20120124306, the contents of which are incorporated herein by reference. In certain implementations, object storage pool 203 and snapshot pool 202 use the same or different application interfaces 204. For example, in an exemplary embodiment, these application interfaces might be a Fibre-Channel or i SC SI target fronting a Linux block device. The object storage pool is implemented as an index that determines where in an external object store 209 any block of data should be stored to or read from. In some implementations, this determination is made by an incremental snapshotting engine 211 within the object storage pool. In other implementations, incremental snapshotting engine 211 is inside copy data management system 201 but is external to the object storage pool 203 and communicatively coupled to object storage pool 203. Data blocks read from object store or written to object store are cached in a local page cache 205; the index is also stored in the object store 209, and cached in a local index cache 206 for example, to increase performance. Object store 209 can have one or more object stores, for example object stores 209a-209c. Read and write access to the various external object stores 209a-209c is brokered locally by broker 207 on object store 203 so an appropriate adapter 208a-208c can be used to interface to different object store APIs. As described above, examples of object store include Google Cloud Storage 209b, Scality RING; IBM Cleversafe 209c; Amazon S3 209a, and Hitachi Content Platform. In certain implementations, object storages 209 provide a simplified interface compared to block storage (which is typically used for primary data). While the feature set of object storage tends to be limited compared to block or file systems, they offer scalability and ease of management. Data is accessed by path (for instance, a URL) in a simple read/write/delete interface. In certain implementations object storages provide more advanced capabilities such as reading and writing of partial objects, or WORM that allows for better long-term management retention and deletion of data.

In certain implementations, the object storage pool 203 implements commands to satisfy the application interface's 204 requests for chunks of data. The pool does this by translating chunks into blocks (app-object translation 213), determining which block is required to provide the content requested (incremental tracking 215, which relies on the index layer, discussed further below), and retrieving blocks from the data cache or object storage so that they can be converted into the requested chunk of data (chunks and blocks of data are described in more detail in reference to FIG. 3A, below). In certain implementations, the object store 209 (e.g., S3) in which the block of data is stored is specified by the user, but the data layout and lifetimes are controlled by the object storage pool 203.

Figure 3A:
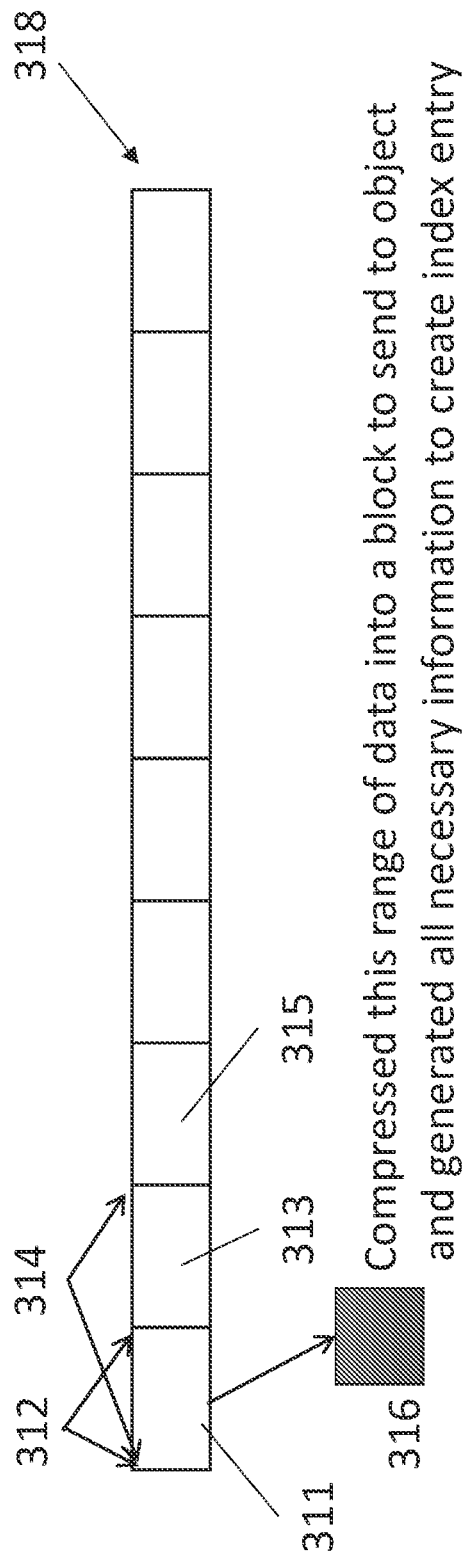
FIG. 3A is a diagram of a storage volume, according to some implementations of the present disclosure.

FIG. 3A is a diagram of storage, (e.g., 102, 106, 104, 108, 142, or 144 in FIG. 1), where data is stored in a native format, according to certain implementations. FIG. 3A shows a revision of a data volume 318 including chunks 311, 313, and 315. The chunks are separated from the beginning of the revision of the data volume 318 by offsets such as 312 and 314. Chunks can be compressed to blocks 316, which can have associated data having a block identifier and metadata.

In certain implementations, to enable storage of the revision of a data volume 318 on object storage (e.g. 209), the revision is broken into chunks, e.g., 311, 313, and 315. The chunks are separated by offsets, e.g., 312 and 314. In certain implementations, the offsets correspond to the number of bytes counted from the beginning of the volume to the corresponding chunk of data. In certain implementations, the chunks are different sizes. In certain implementations, the chunks are of equal size. For example, when chunks are of equal size (e.g., from zero to 100 MB), the offsets will all be an integer multiple of the size of the data chunks. For example, chunk 311 has offset zero, as it is located at the beginning of the volume. Chunk 313 has offset 312. In certain implementations, offset 312 is equal to one, and in certain implementations, it is equal to size in bytes of the chunk 311. Chunk 315 has offset 314. In certain implementations, offset 314 is equal to two, and in certain implementations, it is equal to the aggregate size in bytes of chunks 311 and 312. In certain implementations the chunking of a volume is done at a fixed size, whereas in other implementations the size is not fixed. In certain implementations, the chunk size is determined at the time of backing up the version of the data volume to the object storage pool by analyzing the data to find appropriate boundaries.

To store the chunks of FIG. 3A in object storage, the chunks (311, 313, 315, etc.) are compressed into blocks. Compression can be performed by means known to those skilled in the art. Compressed blocks are sent to the object storage (e.g., 146/203) along data that can be used to construct an entry. For example, chunk 311 is compressed into block 316, and sent with metadata data 317 to the object storage pool 203. In certain implementations, the data includes a block identifier and metadata. In certain implementations, the block identifier includes an identification, e.g., a snapshot ID, to identify the revision of the volume from which the block was created. In certain implementations, the block identifier includes the offset to, for example, identify to what data the block corresponds within revision of the volume. In certain implementations, the block identifier includes both the identification (e.g., snapshot ID) and offset to identify the revision and location of the data to which the block corresponds. In certain implementations, the metadata includes the final size of the block of data (i.e., compressed data). In certain implementations, the block identifier includes a content hash to uniquely identify the chunk of data to which the block corresponds. In certain implementations, the metadata includes a checksum of the chunk of data.

Figure 3B:
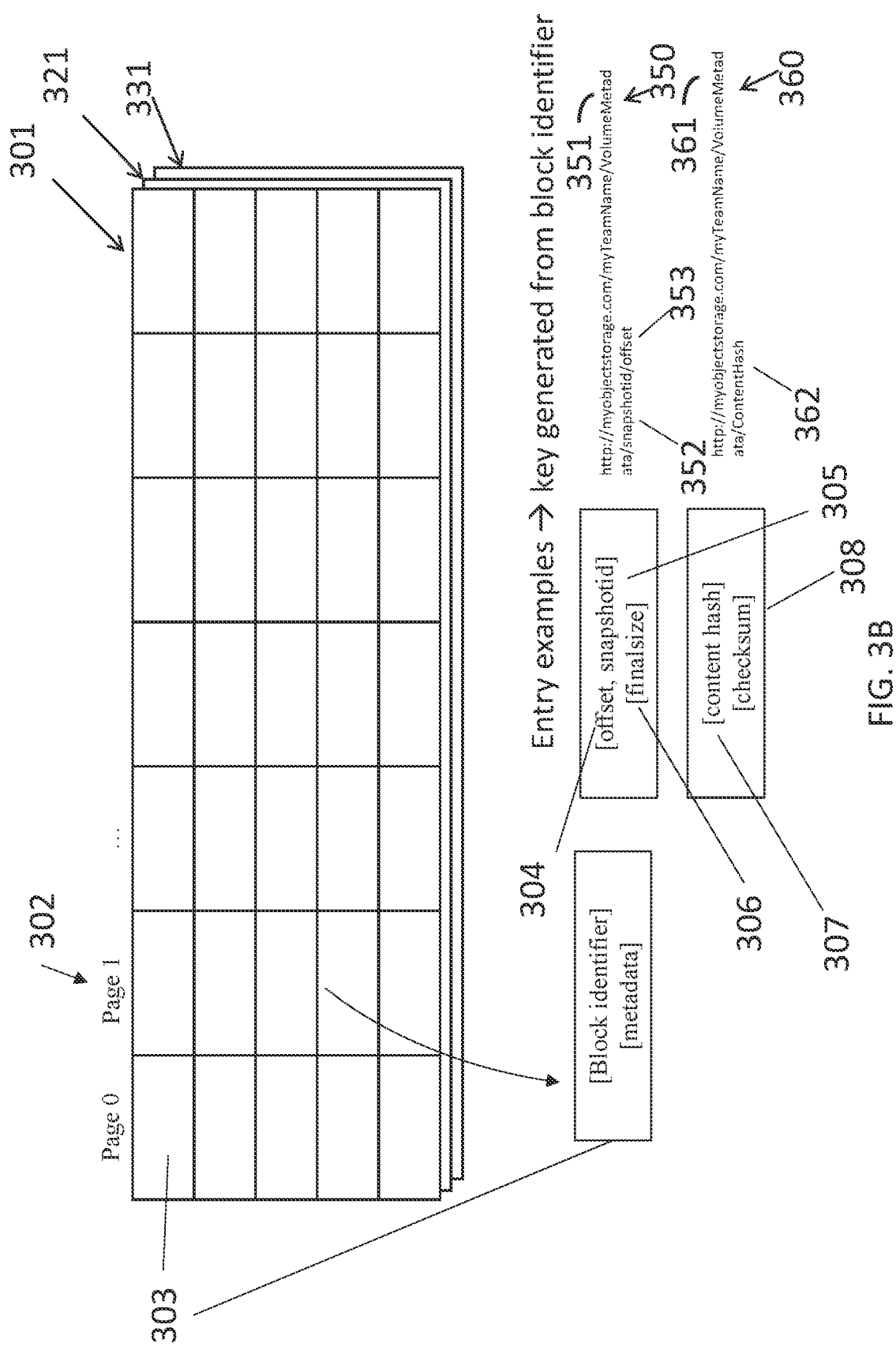
FIG. 3B is a diagram of an index layout for incremental object storage, according to some implementations of the present disclosure.

FIG. 3B is a diagram of an index layout for incremental object storage, according to some implementations of the present disclosure. FIG. 3B shows indexes 301, 321, and 331 having, for example, pages 302 with entries, e.g., 303. The entries include block identifier and metadata, which can include offset 304, snapshotid 305, final size 306, content hash 307, and/or checksum 308. The entries can be used to make keys 350 and 360, which have volume 351, snapshotid 352, and offset 353, and volume 361 and contenthash 362, respectively.

For example, FIG. 3B shows a logical view of an index that is cached in index cache [206] and/or stored in object store 209, as shown in FIG. 2. Logically there is a separate index (301, 321, 331) for each revision of each volume stored. As used herein, a revision refers to a version of a data volume. For example, a data volume can be backed up at multiple times, with each backup representing a state of the data volume at the time of backup. A revision can refer to the state or content of the data volume at each of the backup times. For example, snapshots 1, 2, and 3 can be taken of the volume at different times and corresponding to three revisions of the volume. When stored on the object store (e.g., 209), the system constructs and index for each snapshot (e.g., 301, 321, 331), i.e., an index for each revision of the volume. For example, index 301 can correspond to the revision 318 of a data volume shown in FIG. 3A.

Each revision has an index 301 that is stored as a unique set of pages in object store 209, and the index references one or more pages 302 of data associated with that revision. In certain implementations, each index page corresponds to the same amount of data stored in the corresponding revision of the data volume. In one embodiment, the index is split evenly into pages, so that entries are accessed first by page, then by index into that page. In certain implementations, the pages are chosen to be a reasonable size to provide good data locality but fast storage and retrieval. This is important for on-demand mount capability, where the latency of a request is vital to the application.

The index 301 for a particular revision is broken into pages 302 (the columns shown in FIG. 3B) that are stored in the object store (e.g., 209 in FIG. 2) and cached independently in the index cache (e.g., 206 in FIG. 2). In some implementations, the index pages 302 are all identically sized within the index 301, and each describes a fixed range of data pages within the indexed volume. In certain implementations, the pages within each index being smaller than the index as a whole enable the system to read and write entries to pages separately, enabling a higher degree of efficiency than if the index was not broken into pages. Each page 302 of the index consists of a list of entries 303 corresponding to blocks of data stored in the object store and corresponding chunks of data in primary storage. Each entry includes, in certain implementations, a block identifier and metadata corresponding to the block identifier and metadata discussed above. In certain implementations, each entry includes an offset 304, snap 305 and final size 306 for each block of data in a stored volume (such as object stores 209a-209c in FIG. 2). In certain implementations, each entry includes a content has and a checksum. In some implementations, every entry, for every page, is populated.

As discussed above, offset 304 is a byte offset into the volume for a corresponding entry in a data page of an index. In certain implementations, each volume is completely standalone for the object storage layer, but in certain implementations the other management layers tie volumes together into applications.

As discussed above, snap 305 is an identifier that, combined with offset 304, allows construction of a key to access the single object in the object store that contains the data page for this offset in this revision. In a particular implementation, snap 305 is a 32-bit unsigned integer that's identical for every data page added in a single revision, and the key for the data page is generated by concatenating the hexadecimal representations of snap 305 and offset 304.

As discussed above, final size 306 is the compressed size of the data that's stored in the target object store. This can be used, in certain implementations, in the calculation of how much space would be reclaimed if a revision were deleted.

Key generation: FIG. 3B depicts an example of key generation, according to certain implementations. When the entry includes an offset 304, snap 305 such as snapshotid, and final size 306, a key 350 can be generated. For example, in certain implementations, the key includes a path including volume 351, snapshotid 352, and offset 353 to identify the corresponding block of data stored on the object store (e.g., 209). In certain implementations, the entry includes a content hash 307 as a block identifier and a checksum 308 as metadata. In certain implementations, the system can generate key 360 from the entry, which includes a path including the volume 361 and content hash 362 to identify the corresponding block of data stored on the object store (e.g., 209).

Figure 3C:
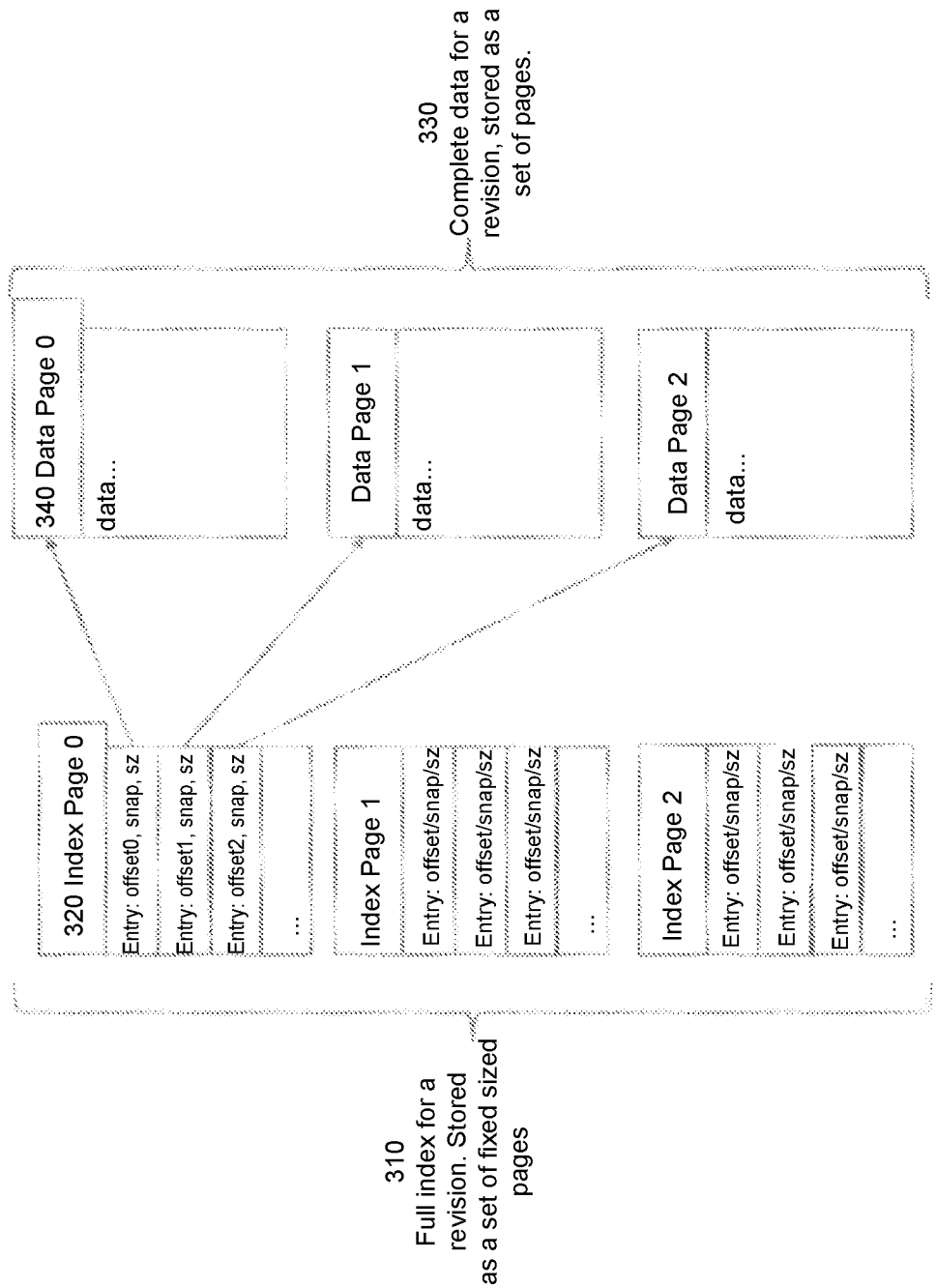
FIG. 3C is a diagram of an index and data page layout, according to some implementations of the present disclosure.

FIG. 3C is a diagram of an index and data page layout, according to some implementations of the present disclosure. FIG. 3C shows a complete index for revision 310 that includes index pages 320. Each entry corresponds to a data page 340 of complete data for the revision 330.

FIG. 3C shows how the index (such as index 301 in FIG. 3B) for a revision is broken into pages, and how the data for a revision is also broken into pages, in accordance with some implementations. The index, 310 consists, in certain implementations, of a full list of offsets and snaps, etc. as described in FIG. 3A. The index 310 is broken into a series of same-size pages, 320.

In certain implementations, the data 330 (for example, data from primary business services 102, backup 104, test/development 106, and compliance 108) for the storage volume revision is broken into a set of same-size chunks, each of which is compressed before storing to a data page 340. Thus, the data pages 340 are not all the same size, but each represents a same-size chunk of the data from the storage volume revision. Each data chunk therefore contains same-size data from a particular offset in the storage volume revision, and it is indexed by an entry in the corresponding index page, 320. The index entries are filled out with the information required by the particular implementation. The information comes from knowledge about the volume being protected (such as, a revision being currently created) as well as the place in the volume currently being processed (such as, this is chunk number 150 which corresponds to offset X. The chunk, after compression, is size Y and has checksum Z).

Figure 4:
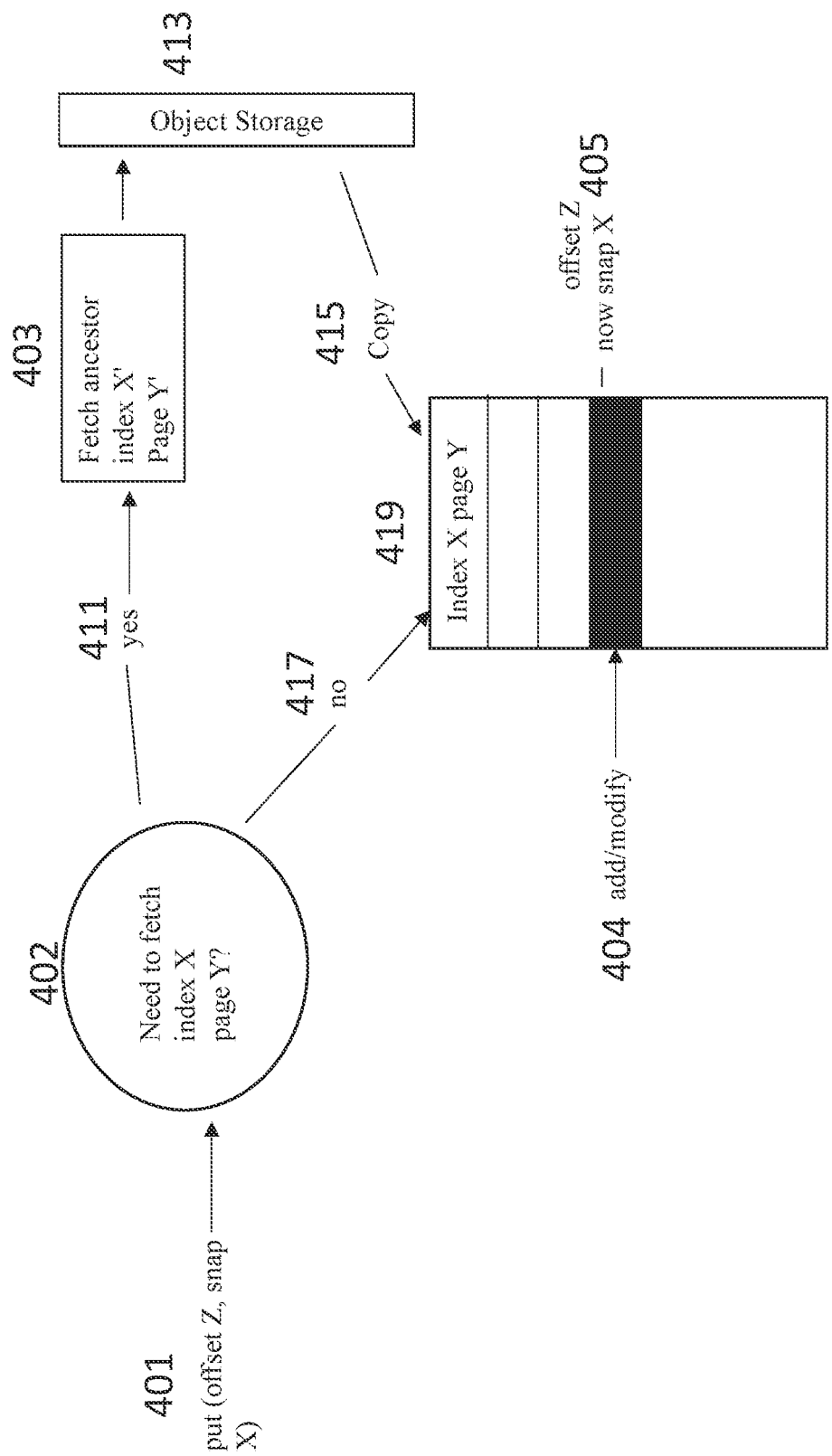
FIG. 4 is a flowchart of index creation during moving data to incremental object storage, according to some implementations of the present disclosure.

FIG. 4 is a flowchart of index creation during moving data to incremental object storage, according to some implementations of the present disclosure.

FIG. 4 diagrams the components involved in index creation while copying a revision X from a local pool to an incremental object storage pool, in accordance with some implementations. The revision being copied is X, and the prior revision is X'.

Each single full data page to be written to object storage has a unique offset Z. From the revision X and the offset Z, the system constructs a key under which the data page is stored in the object store, after being compressed locally. In certain implementations, the key construction and compression is performed on copy data storage 144 and transferred to object storage 146. The index entry is set for the block of this snapshot, using for example, put (offset Z, snap X) 401.

The system then identifies the page Y from index X that should contain the entry for this data page. The page and entry identification is an index implementation based off of the offset Z for the data page. For example, the system looks in the object storage for index page with an entry corresponding to the block of data corresponding to the chunk of data specified input 401. For example, the system uses a combination of the revision (e.g., snap/snapshot ID) X, and offset Z to identify the corresponding index page. The system then checks (402) whether the page Y is already in the index cache. In certain implementations, the system is already in the cache because, if for a backup of a particular revision of a volume there are more than one blocks being copied referring to the same index page, the index page is read from the object store once and present in the cache (e.g., cache 206) for the rest of the operation. If the page is not already in the cache (411), the corresponding X' index page Y' is fetched (403) from object store 413 (e.g., object store 209 in FIG. 2) and copied 415 to the cache (e.g., cache 206) to make Y. Then to populate the index page Y 419, the index entry in Y for the data page at Z is updated (404), overwriting any older entry. For example, there can be an older entry that was copied from Y', that has a "Snap" field referencing revision X', and a "Final-size" field containing the post-compress size of the previous data. The index entry fields for "Snap" and "Final-size" are updated, overwriting any older entry (405) to create the new entry for the revision. (In preferred implementations, the index entry for "Offset" is unchanged). Once the index page is fully updated, it is written back to object store. That is, in certain implementations, the index page is flushed to the object store when the pool has determined that no more modifications to this page are required to complete the revision (i.e., there are no additional blocks to write to the object store for this range of data indexed by the index page).

Figure 5:
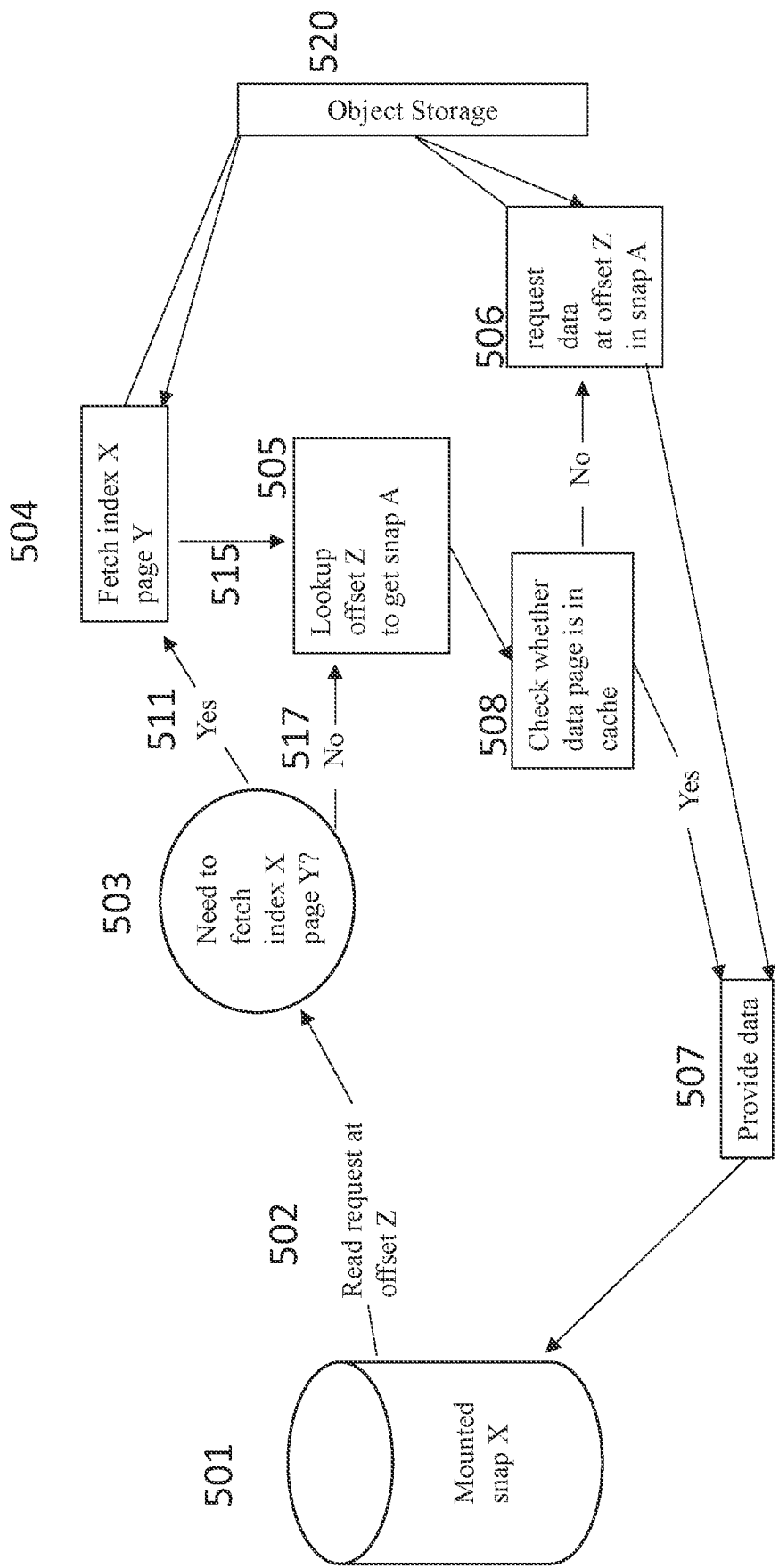
FIG. 5 is a flowchart showing instant access to application data in incremental object storage, according to some implementations of the present disclosure.

FIG. 5 is a flowchart showing instant access to application data in incremental object storage, according to some implementations of the present disclosure.

In some implementations, one goal of instant access is to satisfy reads, in no particular order, from arbitrary offsets within any revision of data set. This is to provide contrast with incremental restore or full restore where the order is defined, in some implementations, by an administrator and/or the copy data management system when constructing a copy. Rather, with instant access, the reads (and writes) are defined by the user operating on the application. The reads can be smaller than a full data page, and can occur and be satisfied in parallel.

In certain implementations, an application generates read requests against storage targets, for example iSCSI or fibre-channel targets. In certain implementations, these read requests translate into read requests at the application interface 204, which handles these as read requests by the incremental object storage pool (e.g., 203 in FIG. 2) to retrieve object data at the object storage pool. In certain implementations, a user (or application) initiates a mount request 501, to gain access to a point-in-time revision of an application that has been previously protected on object store (e.g., 209). The application can be, for example, an Oracle database. In certain implementations, the application's data can exist across several volumes. Each volume is connected to the object storage pool, and the volumes are presented to the host for access. When a read request comes in for revision X 501 at offset Z 502, the system first determines what index page Y contains the entry for that offset, which can be accomplished as discussed above with respect to FIGS. 3A-C and 4. Then the system checks whether page Y is in the index cache 503. If not (511), then page Y is fetched (504) from the object storage 520 and loaded 515 into the index cache (e.g., 206 in FIG. 2). Once page Y has been located in the index cache, e.g., after load page Y is loaded 515 or if page Y did not need to be fetched 517, the entry for offset Z is read, and thus the key for the data page in the object store 520 is determined 505 (for example as discussed above with respect to FIGS. 3A-C). The system checks 508 whether the corresponding data page referenced by the key is in the page cache, and if not, it is fetched 506 from object store 520 and decompressed into the page cache (e.g., 205 in FIG. 2). Lastly the read request is satisfied from page cache by providing 507 the data. The data can then be accessed by the application.

Volume Storage

Implementations of the implementation described herein split, for example, multi-terabyte volumes into pages that are then stored as separate objects in an object store. The page size is fixed within a single volume and all revisions of it. The page size is configurable and can range from 64 KB to 8 MB. Data pages can be compressed and/or encrypted before writing to object storage. In certain implementations, data pages that are entirely zero are not written to the object storage at all. In certain implementations, the page size is not fixed.

Copy Data Management Operations

First Ingest (Copy Data to Object Store) and Incremental Ingest.

In some implementations, a first ingest of a volume into incremental object store iterates over all data pages of an input volume executing the store operation described in FIG. 4. The local source pool can be a snapshot pool, a deduplicating content-addressable store, another object storage pool, direct data access from production storage or from a snapshot of production storage on a virtual machine hypervisor. The target pool is an object store as shown in FIG. 2 209. For a first ingest, there is no preceding revision X', so each time the index page Y is not found in the index cache, it is known that it will not be found in the object store, so it can be created fresh at that time. Therefore, as shown in FIGS. 3A-B, an index can be created having an index page for each data page, each index page having entries for blocks corresponding to chunks from the data page of the storage volume. The index can be stored on the object store along with the blocks, such that the blocks can be accessed by keys (e.g., paths to the blocks) created based on the index page.

An incremental ingest of changes to volume data includes iterating over just the changed pages and executing the store operation from FIG. 4. However, once all the changes have been incorporated into the new revision, a post-processing operation can be executed to ensure that any index pages are created in the new revision, even if they that have not required any new index entries.

Figure 6:
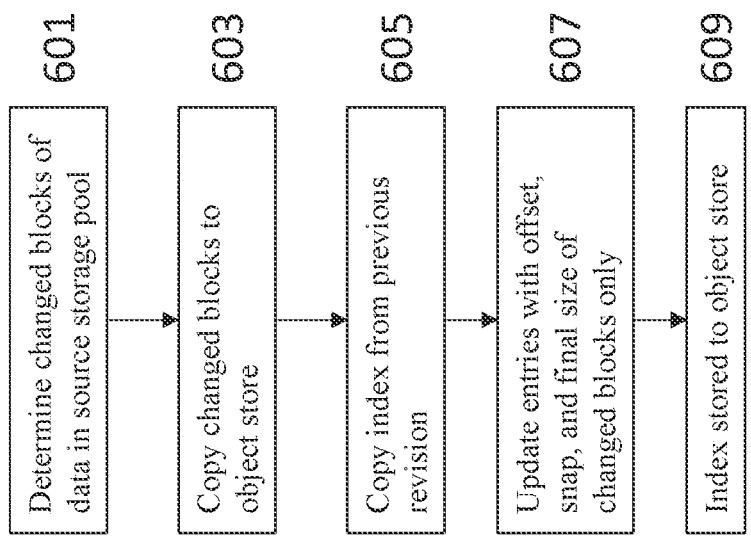
FIG. 6 is a flowchart showing incremental backup to object storage, according to some implementations of the present disclosure.

FIG. 6 depicts an incremental backup of a new revision to an object store, in accordance with some implementations. First, the system (e.g., copy data storage 144 in FIG. 1) determines 601 which blocks of data have changed in the source storage pool (such as primary business services 102, development/test 106, backup 104, or compliance 108 in FIG. 1). This determination can be made, for example, as described in U.S. Patent Pub. No. US20120124306A1, the contents of which are incorporated herein in their entirety. Changed blocks are copied 603 to the object store (e.g., copy storage pool 203 in FIG. 2). In certain implementations, the changed blocks are first copied to a page cache (e.g., page cache 205 in FIG. 2), for example, to increase performance. The index (or in certain implementations, the index page corresponding to the changed blocks of data) from the previous revision is copied 605 to an index cache (e.g., index cache 206 in FIG. 2) as an index (or index page) for the new revision. Entries within the pages of the index are updated 607 with the offset and snap (and final size) only for entries that correspond to the determined changed blocks (as discussed, for example, in FIGS. 3A-C and 4). In certain implementations, the new index for the revision is stored 609 to object store. In certain implementations, the index or index page of the previous revision is cached in the index cache for updating, and once it is completely updated with entries for the changed blocks of data, the page is written to the object store. In certain implementations, the order of FIG. 6 can be implementation defined. For example, the index page for a range of data is stored to the object store when steps 601, 603, 605, and 607 have completed for that particular range, but before the entire revision is processed to complete the index for the revision.

Full Restore: Sequential/Parallel Page Fetch, Incremental Restore, On-Demand Restore A full restore of a volume revision from incremental object store, according to certain implementations, iterates over all data pages of a volume executing the read procedure from FIG. 5 to restore data from the object store for the entire volume. In this case, the index corresponding to the revision of the data volume is retrieved from the object store, and the entries are used to locate and obtain corresponding blocks of data to be restored to the data volume (after decompression). For performance reasons, implementations of this implementation fetches the data pages from a single index page close together in time, so that the index page is more likely to remain in a local cache and not be ejected due to competition from other activities. Multiple data pages can be fetched from the object store in parallel, with the concurrent fetch count and network bandwidth cap configurable. Once the data pages are fetched, they are written to a target pool, which can for example be a snapshot pool, a production storage system, a virtual machine hypervisor, another incremental object store pool or a deduplicating content-addressable store.

For incremental restore, according to certain implementations, it is possible to modify a volume in a local pool to match a volume revision in an incremental object store pool by reading just a small amount of change from the incremental object store pool. This can be achieved by iterating over just the required index pages executing the read procedure from FIG. 5 to obtain only the required blocks of data that need to be restored. For example, to restore to a previous revision, only the chunks of data on the data volume will need to be replaced corresponding blocks of data from the object store (after those blocks are decompressed) from the revision to which the data volume is to be incrementally restored. Again, in certain implementations, pages from a single index page are processed close together in time to maximize cache benefits, and data pages can be fetched in parallel from the object storage system.

Figure 7:
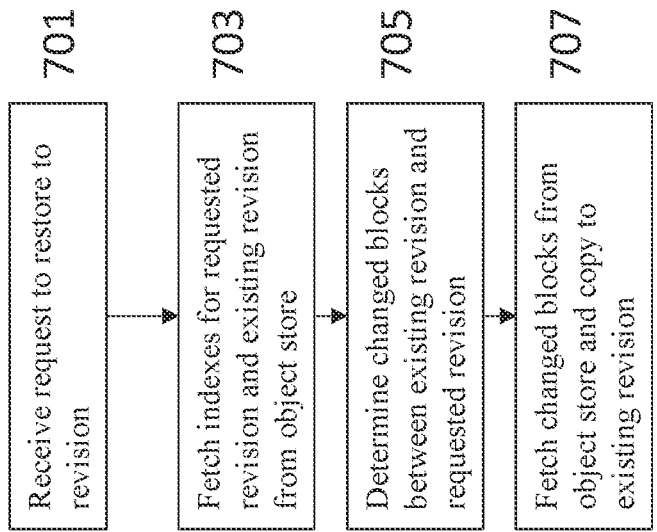
FIG. 7 is a flowchart showing revision restore from object storage, according to some implementations of the present disclosure.

FIG. 7 depicts an incremental restore from an object store, according to certain implementations. At step 701, the system (e.g., copy storage pool 203) receives a request to restore a revision from object store (e.g., object store 209), for example from a user. At step 703, the system fetches the index (or index pages) from the object store for the requested revision to a cache (e.g., index cache 206). At step 705, it is determined what blocks have changed between the existing revision and a requested revision. In certain implementations, this determination is accomplished by comparing index entries for given offsets. For example, a chunk of data has changed if, for the corresponding offset in the index corresponding to the current and requested revision, the final size is different. In certain implementations, for a full restore, there is no existing revision, so it is determined that all blocks have changed. In certain implementations, for an incremental restore, only certain blocks have changed. At step 707, changed blocks are fetched from the object store and copied to the existing revision by, for example, decompressing the blocks and replacing the corresponding chunk with the decompressed block.

For on demand restore, according to certain implementations, an application can access a volume revision in the incremental object storage pool via an application interface, for example 204 in FIG. 2. The application makes sub-page reads at arbitrary (non-sequential) locations within the volume revision. These are satisfied as described in FIG. 5. In some implementations, requests made in parallel can be satisfied in parallel. An on demand restore permits more rapid access of a revision of a data volume because, rather than copy the entire volume to the application, the system merely needs to copy requested blocks from the object store to be accessed by the application. In certain implementations, because data volumes can be large compared to subset of data in the volume that is needed, the on demand restore provides more rapid access because only those data blocks that are needed are mounted or copied, so that the user does not have to wait for a full restore before being able to access data. Implementations of the index disclosed herein permits rapid location of the required data block while simultaneously maintaining efficient use of space in the object store by, for example, only maintaining blocks of data corresponding to changed chunks of data in the data volume.

Figure 8:
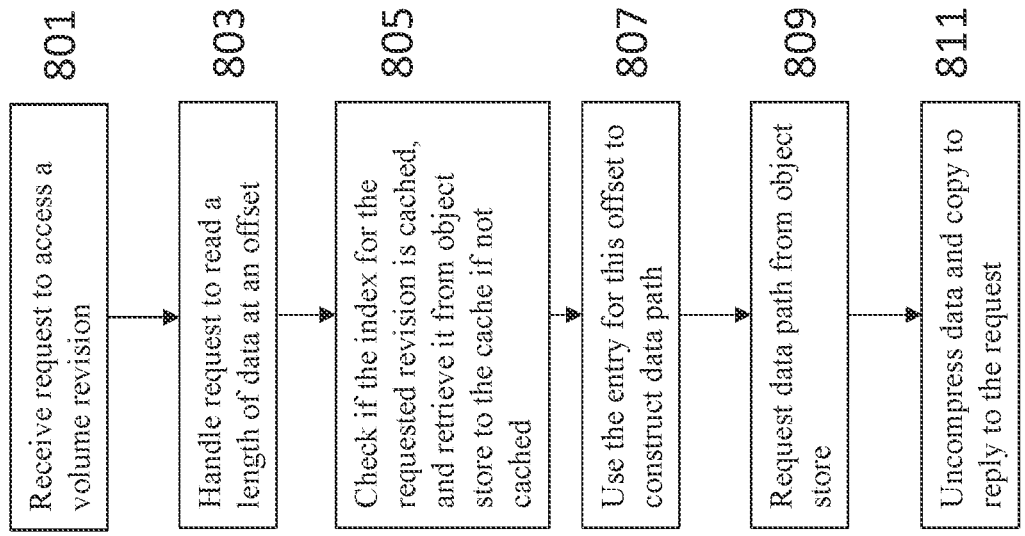
FIG. 8 is a flowchart showing access to a revision from object storage, according to some implementations of the disclosure.

FIG. 8 depicts an on-demand restore, according to certain implementations. The system (e.g., copy storage pool 203) receives a request from an application through an interface (e.g., application interface 204) to access a volume revision in the object storage pool (e.g., object store 209). At step 803, the system analyzes the request to determine to read a length of data starting at an offset in a previous version of a data volume. That is, in certain implementations, rather than copying the entire revision, the system treats the restore as read requests, starting at an offset for the requested data. At step 805, the system checks if the index (or index page) of the requested revision is cached, and if not, it retrieves the index (or index page) for the requested revision from the object store and caches it in an index cache (e.g., index cache 206). At step 807, the system constructs a path (e.g., from the key in FIG. 3B) to retrieve the data from the object store for the requested length of data at an offset. At step 809, the system requests the blocks of data at the data path from the object store. At step 811, the data blocks from the object store are uncompressed and copied to the application to reply to the request. In certain implementations, the blocks of data need not be copied to requesting application, but can instead be mounted so that the application can access the data, thereby further reducing time to access the data.

Delete:

To delete a revision of a volume in an incremental object store, the system can iterate in parallel over index pages for the target revision, its predecessor and successor. In certain implementations, by comparing corresponding index pages between revisions, rather than the entire index, the time to complete the operation can be reduced. When an index entry for the target revision is different from the corresponding entry in both the predecessor and the successor index, then the corresponding data page can be deleted from the object store, freeing up the storage. Once all the entries in a target index page have been compared with the corresponding index pages for successor and predecessor revisions, then the index page can be deleted from the object store, freeing up the storage.

Figure 9:
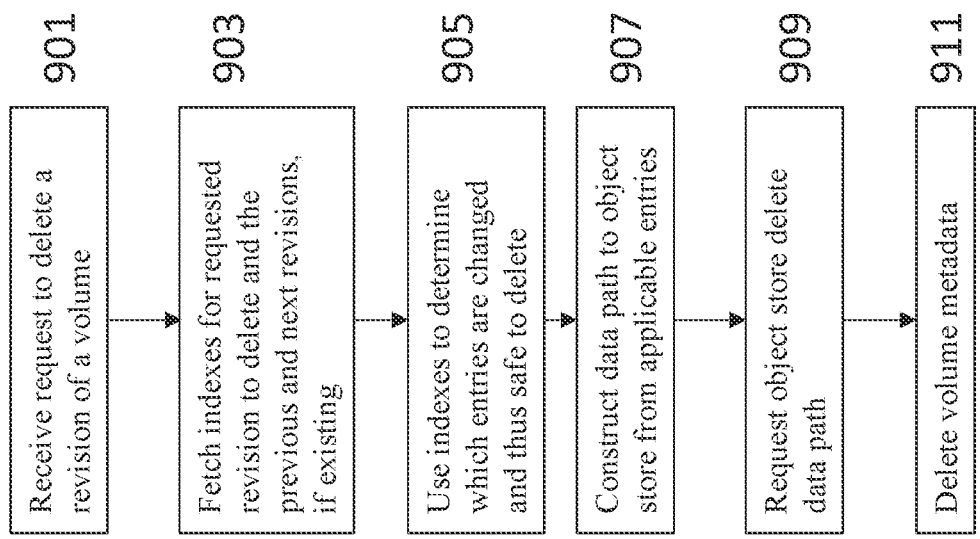
FIG. 9 is a flowchart showing revision delete in object storage, according to some implementations of the present disclosure.

FIG. 9 depicts a delete process, according to certain implementations. At step 901, the system receives, for example from a user, a request to delete a revision of a volume of data. At step 903, the system obtains the index for the requested revision, along with the index for the previous and next index. In certain implementations, the request at step 901 can be to delete multiple revisions, in which case the system must obtain all index pages for the previous and next revisions corresponding to each revision requested for deletion. In certain implementations, the multiple requested revisions are next to each other in time, in which case the system must only obtain indexes for these revisions and the preceding revision to the earliest revision requested for deletion, and next revision from the latest revision scheduled for revision. In certain implementations, the multiple requested revisions are spaced apart in time, in which case the system retrieves the next and previous index for each revision for deletion and iterates over each revision. At step 905, the system determines which entries in each index have been revised since the revision(s) scheduled for deletion, and therefore correspond to blocks of data that are safe to delete because the next revision contains an entry corresponding to a block of data referenced in entries of indexes of all subsequent revisions. By means of non-limiting example, an object store can have indexes A, B, and C corresponding to three consecutive revisions of a data volume (and stored blocks of data on the object store). If the system receives a request to delete the revision corresponding to index B in the object store, the system will compare the entries in index B to the corresponding entries in indexes A and C. If a particular entry in index B has changed by the subsequent revision of index C (i.e., the entry in index C is different than that in index B), and the entry in index B does not the same entry as in index A (i.e., the data changed between the previous revision and the revision corresponding to index B), then the data corresponding to the entry in index B can is safe to delete. If that entry in index B is the same as in index A, then it is not safe to delete the block of data corresponding to that entry because it is still required for index A. By the same token, if an entry in index B is the same as the corresponding entry in index C, then the block corresponding to that entry is not safe to delete because either it is a block from the revision corresponding to index A that is required to construct revisions for index A and C, or it is a block that changed between index A and index B, but is still needed to construct index C. At step 907, the system constructs a path to the to the object store for the entries that are determined to be safe to delete (e.g., as discussed with respect to the key in FIG. 3B). At step 909, the system the system requests that the object store delete the blocks of data in the data path. At step 911, the system deletes the metadata for the volume stored in the object store. In certain implementations, when there are multiple requested revisions, the system either waits until all paths have been created for each requested revision and then performs steps 909 and 911 for all revisions, or the system performs steps 909 and 911 for each revision after step 907 is complete.

Reporting: How Much Space would a Delete Free Up

The space that can be reclaimed by deleting a revision is generally not the same as the space that was consumed by data pages and index pages when the revision was written, which presents a significant challenge for determining efficient use of object storage. This is because of the sharing of data pages with prior and subsequent revisions, and deletions occurring in a different sequence to creation of revisions. Therefore, in certain implementations, the system must determine how much space can be reclaimed if a particular revision were to be removed. To calculate the space reclamation, the system iterates in parallel over index pages for the target revision, its predecessor, and its successor. In certain implementations, by comparing corresponding index pages between revisions, rather than the entire index, the time to complete the operation can be reduced. When the index entry for the target is different from both predecessor and successor, the entry's final size is added to a running tally. When iteration is complete, the tally, plus the space taken by index pages for this revision, is the amount of space that can be reclaimed by delete.

Figure 10:
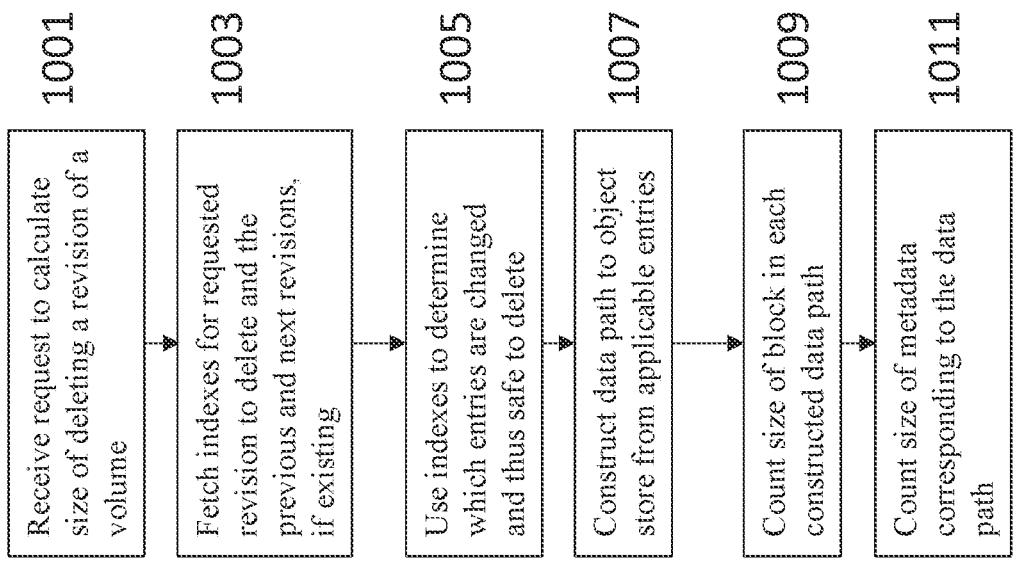
FIG. 10 is a flowchart showing space free-up from a delete in object storage

FIG. 10 depicts a space freeing calculation according to certain implementations. The process is similar, in certain implementations, to the delete process described in FIG. 9, with like numbers corresponding to like steps. At step 1009, however, instead of deleting, as done in step 909, the system counts the amount of data (e.g., compressed data of the corresponding block) in each of the paths constructed in step 1007, and adds the size to a running count. In certain implementations, this process can be done iteratively, e.g., the system need not determine all data paths to changed blocks before counting, but instead counts the size of the data paths, for example, as they are identified. At step 1011, the system counts the size of the metadata in the object store corresponding to the data path. In certain implementations, the system reports the count from steps 1009 and 1011 as the amount of data that would be deleted if a revision of a volume were to be deleted.

Write Once Read Many (WORM)

In certain implementations, to satisfy data compliance, object stores provide WORM (write once read many) functionality. In particular, in certain implementations, the compliance requires that backups are not deleted prior to a length of time since the backup was made. To achieve compliance, in certain implementations, the object store provides a method to tag a block in the object store with a date. Prior to the date, no modification, overwrite, or delete of the block can occur. In certain implementations, the date can be extended, but cannot be retracted in order to satisfy the requirements of WORM.

In particular, in certain implementations, after fully creating a revision (e.g., as described in FIG. 6), the index is enumerated and each block that makes up the revision has the compliance date created or extended, depending on whether the block was created during this revision (e.g., either newly created or as a modified version of a previously included block), or merely referred to as part of the synthetic full (i.e., a backup that copies block of changed data and relies on blocks copied from previous revision for unchanged data). As such, even though the volume that originally added a data block can have passed out of the compliance period, the data block is protected from expiration until all volumes that reference the block are out of the compliance period. In certain implementations, this can be determined by iterating over indexes or index pages to determine whether a block is relied on by subsequent revisions such to require longer protection. In certain implementations, blocks in the object store are updated at each ingest (i.e., each revision) to establish an extension of the compliance time for WORM. For example, if block X is created at a first ingest, then the compliance period is set at that time for block X. If the chunk of data corresponding to that block has not changed at a later incremental ingest (i.e., subsequent revision), then that subsequent ingest will have a corresponding index entry that references block X. Therefore, the compliance time must be extended to reflect longer protection now starting at the subsequent ingest, despite the fact that other blocks from the first ingest come out of the compliance period earlier. In certain implementations, after an ingest is complete, the system iterates over index pages in the index to update the blocks corresponding to each entry with the new compliance times.

In certain implementations, data from the object store is stored in a cache, for example, in object storage pool 203, so that one or more of the above ingest, restore, delete, and space calculation operations do not need to access the object store. Instead, the object storage pool 203 performs steps (e.g., read, write, copy, fetch, etc.) on the cache rather than the object store 209. This can reduce the amount required for each operation.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other implementations and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary implementations, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A computer-implemented method executed by data processing hardware that causes the data processing hardware to perform operations comprising:
receiving first data representing a changed chunk of data in a current revision of a data volume stored on a storage device, the changed chunk of data comprising:
revised data having changes from a first portion of previous data of a previous revision of the data volume; and
original data unchanged from a second portion of previous data of the previous revision of the data volume;
generating a changed block of data representing a copy of the changed chunk of data for storage on the storage device as object data, the storage device further storing:
a copy of the first portion of previous data as a respective version of a first portion of object data; and
a copy of the second portion of previous data as a respective version of a second portion of object data;
generating, based on the changed block of data, an index corresponding to the current revision, the index including:
a first timestamp corresponding to the revised data and representative of a first time instance at which a copy of the revised data was generated for storage as object data, the first timestamp identifying the copy of the revised data as a most recent version of the first portion of object data; and
a second timestamp corresponding to the original data and representative of a second time instance at which the copy of the second portion of previous data was generated for storage as object data, the second timestamp identifying the copy of the second portion of previous data as a most recent version of the second portion of object data;
determining that a threshold period of time has passed from the first time instance; and
in response to determining that the threshold period of time has passed from the first time instance:
permanently deleting, based on the first timestamp identifying the copy of the revised data as the most recent version of the first portion of object data, the copy of the first portion of previous data from the storage device as object data; and
maintaining, based on the second timestamp identifying the second portion of previous data as the most recent version of the second portion of object data, the copy of the second portion of previous data on the storage device as object data.

2. The method of claim 1, wherein the operations further comprise retrieving from storage on the storage device, using the index, the current revision of the data volume.

3. The method of claim 1, wherein generating the index comprises:
determining a previous index stored on the storage device and corresponding to the previous revision of the data volume;
determining a first entry in the previous index identifying the first portion of previous data;
determining a second entry in the previous index identifying the second portion of previous data;
updating the first entry with entry data representing the revised data; and
maintaining entry data of the second entry representing the second portion of previous data.

4. The method of claim 3, wherein generating the index further comprises storing the index on the storage device.

5. The method of claim 1, wherein the operations further comprise:
determining a reliance of the data volume on the first portion of previous data;
updating, based on the reliance, the index to further include a third timestamp corresponding to the first portion of previous data and representative of a third time instance at which the reliance of the data volume on the first portion of previous data was determined;
determining that a second threshold period of time has passed from the third time instance; and
in response to determining that the threshold period of time has passed from the first time instance and that the second threshold period of time has passed from the third time instance, permanently deleting, based on the first timestamp identifying the copy of the revised data as the most recent version of the first portion of object data, the copy of the first portion of previous data from the storage device as object data.

6. The method of claim 1, wherein the index further includes a third timestamp corresponding to the original data and representative of the first time instance, the third timestamp updating the second timestamp.

7. The method of claim 6, wherein the third timestamp extends the second timestamp based on the first time instance.

8. The method of claim 1, wherein the operations further comprise:
receiving a request to calculate a space reclamation amount from permanently deleting the copy of the first portion of previous data from the storage device as object data;
retrieving a plurality of indexes, each index of the plurality of indexes including index entries corresponding to a respective version of the first portion of object data, and the plurality of indexes including:
a previous index corresponding to the previous revision;
a subsequent index corresponding to a subsequent revision occurring after the current revision; and
a plurality of intermediate indexes, the plurality of intermediate indexes including the current revision, and each intermediate index of the plurality of intermediate indexes corresponding to a respective revision occurring between the previous revision and the subsequent revision;
determining, based on a number of intermediate indexes including index entries corresponding to a respective version of the first portion of object data different from both the respective version of the first portion of object data of the previous index and the respective version of the first portion of object data of the subsequent index, a tally of deletable blocks; and
determining, based on the tally of deletable blocks, the space reclamation amount.

9. The method of claim 8, wherein determining the space reclamation amount comprises:

determining a storage size of each deletable block of the tally of deletable blocks;
determining a metadata size of each deletable block of the tally of deletable blocks; and
determining a sum of the storage sizes and the metadata sizes for the tally of deletable blocks.

10. The method of claim 1, wherein generating the changed block of data comprises compressing the changed chunk of data.

11. A system comprising:
data processing hardware; and
memory hardware in communication with the data processing hardware, the memory hardware storing instructions executed on the data processing hardware that cause the data processing hardware to perform operations comprising:
  receiving first data representing a changed chunk of data in a current revision of a data volume stored on a storage device, the changed chunk of data comprising:
    revised data having changes from a first portion of previous data of a previous revision of the data volume; and
    original data unchanged from a second portion of previous data of the previous revision of the data volume;
  generating a changed block of data representing a copy of the changed chunk of data for storage on the storage device as object data, the storage device further storing:
    a copy of the first portion of previous data as a respective version of a first portion of object data; and
    a copy of the second portion of previous data as a respective version of a second portion of object data;
  generating, based on the changed block of data, an index corresponding to the current revision, the index including:
    a first timestamp corresponding to the revised data and representative of a first time instance at which a copy of the revised data was generated for storage as object data, the first timestamp identifying the copy of the revised data as a most recent version of the first portion of object data; and
    a second timestamp corresponding to the original data and representative of a second time instance at which the copy of the second portion of previous data was generated for storage as object data, the second timestamp identifying the copy of the second portion of object data as a most recent version of the second portion of object data;
  determining that a threshold period of time has passed from the first time instance; and
  in response to determining that the threshold period of time has passed from the first time instance:
    permanently deleting, based on the first timestamp identifying the copy of the revised data as the most recent version of the first portion of object data, the copy of the first portion of previous data from the storage device as object data; and
    maintaining, based on the second timestamp identifying the second portion of previous data as the most recent version of the second portion of object data, the copy of the second portion of previous data on the storage device as object data.

12. The system of claim 11, wherein the operations further comprise retrieving from storage on the storage device, using the index, the current revision of the data volume.

13. The system of claim 11, wherein generating the index comprises:
  determining a previous index stored on the storage device and corresponding to the previous revision of the data volume;
  determining a first entry in the previous index identifying the first portion of previous data;
  determining a second entry in the previous index identifying the second portion of previous data;
  updating the first entry with entry data representing the revised data; and
  maintaining entry data of the second entry representing the second portion of previous data.

14. The system of claim 13, wherein generating the index further comprises storing the index on the storage device.

15. The system of claim 11, wherein the operations further comprise:
  determining a reliance of the data volume on the first portion of previous data;
  updating, based on the reliance, the index to further include a third timestamp corresponding to the first portion of previous data and representative of a third time instance at which the reliance of the data volume on the first portion of previous data was determined;
  determining that a second threshold period of time has passed from the third time instance; and
  in response to determining that the threshold period of time has passed from the first time instance and that the second threshold period of time has passed from the third time instance, permanently deleting, based on the first timestamp identifying the copy of the revised data as the most recent version of the first portion of object data, the copy of the first portion of previous data from the storage device as object data.

16. The system of claim 11, wherein the index further includes a third timestamp corresponding to the original data and representative of the first time instance, the third timestamp updating the second timestamp.

17. The system of claim 16, wherein the third timestamp extends the second timestamp based on the first time instance.

18. The system of claim 11, wherein the operations further comprise:
  receiving a request to calculate a space reclamation amount from permanently deleting the copy of the first portion of previous data from the storage device as object data;
  retrieving a plurality of indexes, each index of the plurality of indexes including index entries corresponding to a respective version of the first portion of object data, and the plurality of indexes including:
    a previous index corresponding to the previous revision;
    a subsequent index corresponding to a subsequent revision occurring after the current revision; and
    a plurality of intermediate indexes, the plurality of intermediate indexes including the current revision, and each intermediate index of the plurality of intermediate indexes corresponding to a respective revision occurring between the previous revision and the subsequent revision;
  determining, based on a number of intermediate indexes including index entries corresponding to a respective version of the first portion of object data different from both the respective version of the first portion of object data of the previous index and the respective version of the first portion of object data of the subsequent index, a tally of deletable blocks; and determining, based on the tally of deletable blocks, the space reclamation amount.

19. The system of claim 18, wherein determining the space reclamation amount comprises:

determining a storage size of each deletable block of the tally of deletable blocks;

determining a metadata size of each deletable block of the tally of deletable blocks; and determining a sum of the storage sizes and the metadata sizes for the tally of deletable blocks.

20. The system of claim 11, wherein generating the changed block of data comprises compressing the changed chunk of data.

\* \* \* \* \*